United States Patent
Wang et al.

(10) Patent No.: US 11,006,379 B2
(45) Date of Patent: May 11, 2021

(54) SYNCHRONIZATION INFORMATION IDENTIFICATION METHOD AND APPARATUS

(71) Applicant: Huawei Technologies Co., Ltd., Shenzhen (CN)

(72) Inventors: Ting Wang, Shanghai (CN); Yuanjie Li, Shanghai (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/045,174

(22) Filed: Jul. 25, 2018

(65) Prior Publication Data
US 2018/0368092 A1 Dec. 20, 2018

Related U.S. Application Data
(63) Continuation of application No. PCT/CN2017/072260, filed on Jan. 23, 2017.

(30) Foreign Application Priority Data
Jan. 26, 2016 (CN) .......................... 201610051946.X

(51) Int. Cl.
*H04W 56/00* (2009.01)
(52) U.S. Cl.
CPC ....... *H04W 56/0025* (2013.01); *H04W 56/00* (2013.01)
(58) Field of Classification Search
CPC .... H04B 7/0617; H04B 7/0695; H04B 7/088; H04W 56/00; H04W 56/0005;
(Continued)

(56) References Cited

U.S. PATENT DOCUMENTS

| 7,406,065 B2 * | 7/2008 | Willenegger ..... H04W 56/0085 370/335 |
| 10,219,231 B2 * | 2/2019 | Stirling-Gallacher ...................... H04B 7/0617 |

(Continued)

FOREIGN PATENT DOCUMENTS

| CN | 104170480 A | 11/2014 |
| CN | 104219757 A | 12/2014 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 13), 3GPP TS 36.213 V13.0.0 (Dec. 2015), 326 pages.

(Continued)

*Primary Examiner* — Eric Nowlin
(74) *Attorney, Agent, or Firm* — Slater Matsil, LLP

(57) ABSTRACT

This application discloses a synchronization information identification method and apparatus, and relates to the communications field. The method includes: receiving, by a terminal, synchronization information; obtaining, by the terminal, a synchronization information index of the synchronization information; determining, by the terminal, a symbol location of the synchronization information in accordance with a correspondence between the synchronization information index and the symbol location.

16 Claims, 11 Drawing Sheets

---

A first wireless network device receives synchronization information from a second wireless network device, and obtains time-domain location information of the synchronization information from synchronization configuration information corresponding to the synchronization information — 101

The first wireless network device determines, according to a relative time-domain location of an outer loop time segment in a synchronization period and/or a relative time-domain location of an inner loop time segment in the synchronization period, and the time-domain location information of the synchronization information, whether the synchronization information is in the outer loop time segment or the inner loop time segment — 102

(58) Field of Classification Search
CPC ........... H04W 56/001; H04W 56/0015; H04W 56/0025; H04W 16/28; H04W 72/042
See application file for complete search history.

(56) References Cited

U.S. PATENT DOCUMENTS

| | | | | |
|---|---|---|---|---|
| 10,292,103 | B2* | 5/2019 | Abraham | H04W 52/0225 |
| 10,292,123 | B2* | 5/2019 | Agiwal | H04W 56/001 |
| 10,368,302 | B2* | 7/2019 | da Silva | H04W 48/10 |
| 10,411,940 | B2* | 9/2019 | Ko | H04W 48/08 |
| 2003/0174686 | A1* | 9/2003 | Willenegger | H04B 7/022 370/342 |
| 2009/0010244 | A1* | 1/2009 | Laroia | H04L 5/0007 370/350 |
| 2012/0195256 | A1 | 8/2012 | Khoury | |
| 2014/0086217 | A1* | 3/2014 | Park | H04B 7/0413 370/335 |
| 2014/0247808 | A1 | 9/2014 | Zhang et al. | |
| 2014/0293851 | A1* | 10/2014 | Abraham | H04W 52/0225 370/311 |
| 2014/0321375 | A1* | 10/2014 | Agiwal | H04W 56/001 370/329 |
| 2016/0198441 | A1* | 7/2016 | Xia | H04W 72/042 370/329 |
| 2016/0277165 | A1* | 9/2016 | Wei | H04L 5/0048 |
| 2017/0150461 | A1* | 5/2017 | Li | H04W 56/00 |
| 2017/0311274 | A1* | 10/2017 | Yu | H04W 72/046 |
| 2017/0325057 | A1* | 11/2017 | Zhang | H04W 4/02 |
| 2017/0325244 | A1* | 11/2017 | Zhang | H04W 24/10 |
| 2017/0325260 | A1* | 11/2017 | Guo | H04L 27/2602 |
| 2018/0035396 | A1* | 2/2018 | Stirling-Gallacher | H04B 7/0695 |
| 2018/0041949 | A1* | 2/2018 | Liu | H04W 48/16 |
| 2018/0042000 | A1* | 2/2018 | Zhang | H04B 7/04 |
| 2018/0219596 | A1* | 8/2018 | He | H04W 72/04 |
| 2018/0278314 | A1* | 9/2018 | Nam | H04W 72/042 |
| 2018/0302904 | A1* | 10/2018 | Li | H04L 27/34 |
| 2018/0324682 | A1* | 11/2018 | da Silva | H04W 48/16 |
| 2018/0324732 | A1* | 11/2018 | Park | H04W 56/0015 |
| 2018/0343156 | A1* | 11/2018 | Malik | H04B 7/0695 |
| 2018/0367204 | A1* | 12/2018 | Zhang | H04B 7/0695 |
| 2018/0368092 | A1* | 12/2018 | Wang | H04W 56/0025 |
| 2019/0028315 | A1* | 1/2019 | Park | H04L 5/0044 |
| 2019/0058538 | A1* | 2/2019 | Sun | H04B 7/0413 |
| 2019/0059012 | A1* | 2/2019 | Nam | H04W 56/001 |
| 2019/0081689 | A1* | 3/2019 | Yu | H04W 36/06 |
| 2019/0082335 | A1* | 3/2019 | Yu | H04W 76/19 |
| 2019/0124610 | A1* | 4/2019 | Stirling-Gallacher | H04W 56/0005 |
| 2019/0149383 | A1* | 5/2019 | Ko | H04W 48/12 370/329 |
| 2019/0173600 | A1* | 6/2019 | Cheng | H04J 11/0076 |
| 2019/0174436 | A1* | 6/2019 | da Silva | H04B 7/0695 |
| 2019/0319699 | A1* | 10/2019 | Lee | H04B 7/2656 |
| 2019/0327696 | A1* | 10/2019 | Oh | H04L 5/0048 |
| 2019/0335434 | A1* | 10/2019 | Wang | H04W 72/04 |
| 2019/0342805 | A1* | 11/2019 | Hao | H04W 36/0072 |
| 2019/0357239 | A1* | 11/2019 | Moon | H04W 72/1263 |
| 2019/0364523 | A1* | 11/2019 | Wei | H04W 76/11 |
| 2019/0380098 | A1* | 12/2019 | Liu | H04L 5/00 |
| 2019/0387470 | A1* | 12/2019 | Nam | H04W 72/14 |
| 2019/0387488 | A1* | 12/2019 | Wang | H04W 72/005 |
| 2019/0394779 | A1* | 12/2019 | Guan | H04W 74/006 |
| 2020/0007216 | A1* | 1/2020 | Nasiri Khormuji | H04B 7/0632 |
| 2020/0008247 | A1* | 1/2020 | Kwak | H04B 7/088 |

FOREIGN PATENT DOCUMENTS

| | | | | |
|---|---|---|---|---|
| CN | 105075302 | A | 11/2015 | |
| CN | 105122907 | A | 12/2015 | |
| EP | 2782306 | A1 | 9/2014 | |
| EP | 2989730 | A1 * | 3/2016 | ........ H04W 56/001 |
| EP | 2989730 | A4 * | 11/2016 | ........ H04W 56/001 |
| JP | 2014532320 | A | 12/2014 | |
| KR | 20090010244 | A * | 1/2009 | |
| KR | 20090010244 | U * | 10/2009 | |
| KR | 20140086217 | A * | 7/2014 | ........ H01M 8/04126 |
| WO | 2014089252 | A1 | 6/2014 | |
| WO | WO-2014089252 | A1 * | 6/2014 | |
| WO | 2014175696 | A1 | 10/2014 | |
| WO | 2015080646 | A1 | 6/2015 | |
| WO | 2015172364 | A1 | 11/2015 | |
| WO | 2015172506 | A1 | 11/2015 | |

OTHER PUBLICATIONS

Huawei et al., "Synchronization Signal Design in NR", 3GPP TSG RAN WG1 Meeting #86bis, R1-1608846, Lisbon, Portugal, Oct. 10-14, 2016, 5 pages.

* cited by examiner

SYNCHRONIZATION INFORMATION IDENTIFICATION METHOD AND APPARATUS

CROSS-REFERENCE TO RELATED APPLICATIONS

This application is a continuation of International Application No. PCT/CN2017/072260, filed on Jan. 23, 2017, which claims priority to Chinese Patent Application No. 201610051946.X, filed on Jan. 26, 2016. The disclosures of the aforementioned applications are hereby incorporated by reference in their entireties.

TECHNICAL FIELD

This application relates to the wireless communications field, and in particular, to a synchronization information identification method and apparatus.

BACKGROUND

With rapid development of communications technologies, beams are usually used between a base station and a wireless network device for communication, to reduce attenuation of a communication signal during transmission, and increase a signal transmission distance, so that a signal sent by the base station may cover a larger area.

Usually, information synchronization needs to be performed periodically during communication performed between the base station and the wireless network device. A synchronization period includes an outer loop time segment (referred to as a discovery message time segment) and an inner loop time segment (referred to as a common message time segment). In the information synchronization process, in the outer loop time segment of the synchronization period, the base station usually sends different synchronization information in adjacent radio frames to different directions (each direction is corresponding to a beam). After receiving a piece of synchronization information each time, the wireless network device may access the base station based on the synchronization information, and send a corresponding feedback message to the base station, to instruct the base station to send a subsequent message to the direction in the inner loop time segment.

In an implementation process of this application, the inventor finds that at least the following problem exists in a related technology:

To reduce a latency required for the wireless network device to access the base station, the base station also sends synchronization information while sending a subsequent message in the inner loop time segment. However, after receiving the synchronization information that is sent in the inner loop time segment by the base station, the wireless network device cannot determine a time segment of the synchronization information, and the wireless network device sends, to the base station, a feedback message that is not originally required to be sent. Consequently, a waste of communications resources of the wireless network device is caused.

SUMMARY

To resolve a related technical problem, embodiments of this application provide a synchronization information identification method and apparatus. The technical solutions are as follows:

According to a first aspect, a synchronization information identification method is provided. The method includes receiving, by a first wireless network device, synchronization information from a second wireless network device, and obtaining time-domain location information of the synchronization information from synchronization configuration information corresponding to the synchronization information. The method also includes determining, by the first wireless network device according to a relative time-domain location of an outer loop time segment in a synchronization period and/or a relative time-domain location of an inner loop time segment in the synchronization period, and the time-domain location information of the synchronization information, whether the synchronization information is in the outer loop time segment or the inner loop time segment.

The synchronization information may be information used by the first wireless network device to perform time-frequency synchronization with the second wireless network device. The time-domain location information may be a frame number of a radio frame for the synchronization information. The synchronization configuration information may be information for radio communication resource configuration corresponding to the synchronization information, such as PBCH broadcast information. A relative time-domain location may be a corresponding specific time segment of the outer loop time segment or the inner loop time segment in the synchronization period, and may be specifically represented as a frame number of a corresponding radio frame.

The second wireless network device may send the synchronization information by means of a beam in the outer loop time segment of each synchronization period according to a preset synchronization period, to each cell or beam served by the second wireless network device. Further, the first wireless network device may obtain the synchronization configuration information corresponding to the synchronization information, and obtain the time-domain location information of the synchronization information from the synchronization configuration information. After obtaining the frame number of the radio frame for the synchronization information, the first wireless network device may determine, according to the frame numbers of the radio frames corresponding to the outer loop time segment and the inner loop time segment in the synchronization period, whether the frame number of the radio frame for the synchronization information is a frame number of a radio frame in the outer loop time segment or a frame number of a radio frame in the inner time segment, so as to determine whether the synchronization information is in the outer loop time segment or the inner loop time segment. If the first wireless network device determines that the received synchronization information is in the outer loop time segment, the first wireless network device may send feedback information to the second wireless network device on an uplink resource configured in the current synchronization period. The feedback information is corresponding to the synchronization information, so that the second wireless network device learns that there is a requirement for sending subsequent information in a beam direction of the synchronization information.

With reference to the first aspect, in a first possible implementation of the first aspect, the time-domain location information of the synchronization information is the frame number of the radio frame for the synchronization information.

With reference to the first aspect or the first possible implementation of the first aspect, in a second possible implementation of the first aspect, the outer loop time segment includes a dedicated discovery subframe, where the dedicated discovery subframe is used to send synchronization information of different cells and/or beams.

Using the dedicated discovery subframe to send the synchronization information in the outer loop time segment can ensure that the second wireless network device sends all synchronization information in first several subframes of the synchronization period, so that the first wireless network device can receive the corresponding synchronization information as early as possible.

With reference to the first aspect or the first or the second possible implementation of the first aspect, in a third possible implementation of the first aspect, the obtaining time-domain location information of the synchronization information from synchronization configuration information corresponding to the synchronization information includes: obtaining the time-domain location information of the synchronization information from the PBCH broadcast information corresponding to the synchronization information.

After the synchronization information is received, the time-domain location information of the synchronization information may be obtained from the configuration information related to the synchronization information.

With reference to the first aspect or the first to the third possible implementations of the first aspect, in a fourth possible implementation of the first aspect, the method further includes: determining, by the first wireless network device, the relative time-domain location of the outer loop time segment in the synchronization period and/or the relative time-domain location of the inner loop time segment in the synchronization period according to a length of the synchronization period and a total beam quantity.

If the length of the synchronization period is T, a length of a radio frame is $T_{rf}$, and a length of a subframe is $T_{sf}$, it can be determined that the synchronization period includes $N_{rf}=T/T_{rf}$ radio frames, and that the radio frame includes $N_{sf}=T_{rf}/T_{sf}$ subframes. In addition, if the total beam quantity is N, and each radio frame may carry synchronization information of K beams, and for a frame number $n_{rf}$ of the radio frame, $n_{rf}$ is greater than or equal to $k \cdot N_{rf}$ and less than $k \cdot N_{rf}+(N/K)$, where k is a natural number, the radio frame is in the outer loop time segment; otherwise, if $n_{rf}$ is less than $k \cdot N_{rf}$ or greater than or equal to $k \cdot N_{rf}+(N/K)$, the radio frame is in the inner loop time segment.

In this way, the locations of the inner and outer loop time segments in the synchronization period may be directly determined according to the length of the synchronization period and the total beam quantity.

With reference to the fourth possible implementation of the first aspect, in a fifth possible implementation of the first aspect, the determining, by the first wireless network device, the relative time-domain location of the outer loop time segment in the synchronization period and/or the relative time-domain location of the inner loop time segment in the synchronization period according to a length of the synchronization period and a total beam quantity includes: determining, by the first wireless network device, the relative time-domain location of the outer loop time segment in the synchronization period and/or the relative time-domain location of the inner loop time segment in the synchronization period according to a preset synchronization period length and a preset total beam quantity; or determining, by the first wireless network device, the relative time-domain location of the outer loop time segment in the synchronization period and/or the relative time-domain location of the inner loop time segment in the synchronization period according to indication information that is of the length of the synchronization period and the total beam quantity and that is carried in RRC signaling; or determining, by the first wireless network device, the relative time-domain location of the outer loop time segment in the synchronization period and/or the relative time-domain location of the inner loop time segment in the synchronization period according to indication information that is of the length of the synchronization period and the total beam quantity and that is carried in the PBCH broadcast information.

The indication information of the length of the synchronization period and the indication information of the total beam quantity may be separately obtained in different manners.

Therefore, the length of the synchronization period and the total beam quantity may be obtained in multiple manners.

With reference to any one of the first aspect or the first to the fifth possible implementations of the first aspect, in a sixth possible implementation of the first aspect, the determining, by the first wireless network device according to a relative time-domain location of an outer loop time segment in a synchronization period and/or a relative time-domain location of an inner loop time segment in the synchronization period, and the time-domain location information of the synchronization information, whether the synchronization information is in the outer loop time segment or the inner loop time segment includes: determining, by the first wireless network device according to the relative time-domain location of the outer loop time segment in the synchronization period and/or the relative time-domain location of the inner loop time segment in the synchronization period, and the time-domain location information of the synchronization information, whether the radio frame for the synchronization information is an outer loop radio frame or an inner loop radio frame; and if the radio frame for the synchronization information is the outer loop radio frame, determining, by the first wireless network device, that the synchronization information is in the outer loop time segment; or if the radio frame for the synchronization information is the inner loop radio frame, determining, by the first wireless network device, that the synchronization information is in the inner loop time segment.

In this way, whether the synchronization information is in the outer loop time segment or the inner loop time segment may be determined according to whether the synchronization information is in the outer loop radio frame or the inner loop radio frame.

With reference to the sixth possible implementation of the first aspect, in a seventh possible implementation of the first aspect, the method further includes: if it is determined, according to a relative time-domain location of the outer loop radio frame in the synchronization period and/or a relative time-domain location of the inner loop radio frame in the synchronization period, and the time-domain location information of the synchronization information, that the radio frame for the synchronization information is a hybrid radio frame, obtaining, by the first wireless network device, a beam identifier in the synchronization information, where the hybrid radio frame is a radio frame including a part of the outer loop time segment and a part of the inner loop time segment; and determining, by the first wireless network device according to a preset beam identifier corresponding to the outer loop time segment in the hybrid radio frame, a preset beam identifier corresponding to the inner loop time segment in the hybrid radio frame, and the beam identifier in the synchronization information, whether the synchronization information is in the outer loop time segment or the inner loop time segment.

If a radio frame includes both a part of the inner loop time segment and a part of the outer loop time segment, it is considered that the radio frame is a hybrid radio frame. After obtaining the frame number of the radio frame for the synchronization information, the first wireless network device may determine, according to frame numbers of radio frames corresponding to the outer loop radio frame and the inner loop radio frame in the synchronization period, whether the frame number of the radio frame for the synchronization information is a frame number of a radio frame in the outer loop time segment, a frame number of a radio frame in the inner loop time segment, or a frame number of a hybrid radio frame. If determining that the frame number of the radio frame for the received synchronization information is the frame number of the hybrid radio frame, the first wireless network device may determine that the radio frame for the received synchronization information is the hybrid radio frame, and further the first wireless network device may obtain the beam identifier in the synchronization information.

The second wireless network device may preset the beam identifier corresponding to the outer loop time segment and the beam identifier corresponding to the inner loop time segment in the hybrid radio frame, that is, set a correspondence between inner and outer loop time segments and beam identifiers in synchronization information that is sent in the hybrid radio frame. In an optional solution, a subframe corresponding to synchronization information that is sent in the inner loop time segment is fixed. Therefore, the first wireless network device may determine, according to the beam identifier in the synchronization information and the correspondence, whether the synchronization information is in the outer loop time segment or the inner loop time segment.

In this way, whether the synchronization information is in the outer loop time segment or the inner loop time segment may be directly determined according to the beam identifier in the synchronization information.

With reference to the sixth possible implementation of the first aspect, in an eighth possible implementation of the first aspect, the method further includes: if it is determined, according to a relative time-domain location of the outer loop radio frame in the synchronization period and/or a relative time-domain location of the inner loop radio frame in the synchronization period, and the time-domain location information of the synchronization information, that the radio frame for the synchronization information is a hybrid radio frame, obtaining, by the first wireless network device, a subframe number of a subframe for the synchronization information; and determining, by the first wireless network device according to a preset subframe number corresponding to the outer loop time segment in the hybrid radio frame, a preset subframe number corresponding to the inner loop time segment in the hybrid radio frame, and the subframe number of the subframe for the synchronization information, whether the synchronization information is in the outer loop time segment or the inner loop time segment.

After obtaining the frame number of the radio frame for the synchronization information, the first wireless network device may determine, according to frame numbers of radio frames corresponding to the outer loop radio frame and the inner loop radio frame in the synchronization period, whether the frame number of the radio frame for the synchronization information is a frame number of a radio frame in the outer loop time segment, a frame number of a radio frame in the inner loop time segment, or a frame number of the hybrid radio frame. If determining that the frame number of the radio frame for the received synchronization information is the frame number of the hybrid radio frame, the first wireless network device may determine that the radio frame for the received synchronization information is the hybrid radio frame, and further the first wireless network device may obtain the beam identifier in the synchronization information.

The second wireless network device may preset the subframe number corresponding to the outer loop time segment and the subframe number corresponding to the inner loop time segment in the hybrid radio frame, that is, set a correspondence between inner and outer loop time segments and subframe numbers in synchronization information that is sent in the hybrid radio frame. In an optional solution, a subframe corresponding to synchronization information that is sent in the inner loop time segment is fixed. Therefore, the first wireless network device may determine, according to the subframe number of the subframe for the synchronization information and the correspondence, whether the synchronization information is in the outer loop time segment or the inner loop time segment.

In this way, whether the synchronization information is in the outer loop time segment or the inner loop time segment may be directly determined according to the subframe number of the subframe for the synchronization information.

With reference to the eighth possible implementation of the first aspect, in a ninth possible implementation of the first aspect, the obtaining a subframe number of a subframe for the synchronization information includes: obtaining, by the first wireless network device from the PBCH broadcast information corresponding to the synchronization information, the subframe number of the subframe for the synchronization information; or determining, by the first wireless network device according to the preset beam identifier corresponding to the outer loop time segment in the hybrid radio frame, the preset beam identifier corresponding to the inner loop time segment in the hybrid radio frame, and the beam identifier in the synchronization information, the subframe number of the subframe for the synchronization information.

The second wireless network device may send, on a PBCH broadcast information channel corresponding to each piece of synchronization information, the PBCH broadcast information corresponding to the synchronization information. After receiving a piece of synchronization information, the first wireless network device may obtain, from the PBCH broadcast information corresponding to the synchronization information, the subframe number of the subframe for the synchronization information. Alternatively, the second wireless network device may preset a correspondence between inner and outer loop time segments in a hybrid radio frame and beam identifiers in synchronization information. In this way, when obtaining the beam identifier in the synchronization information, the first wireless network device may determine the subframe number of the subframe for the synchronization information according to the correspondence.

Therefore, the subframe number of the subframe for the synchronization information may be obtained in multiple manners.

With reference to the first aspect or the first to the ninth possible implementations of the first aspect, in a tenth possible implementation of the first aspect, after the receiving, by a first wireless network device, synchronization information from a second wireless network device, the method further includes: determining, by the first wireless network device, a symbol location of the synchronization information, and performing time-domain symbol synchronization according to the symbol location of the synchronization information.

When a subframe carries multiple pieces of synchronization information, after receiving the synchronization information, the first wireless network device may obtain the symbol location of the synchronization information, that is, determine a specific time corresponding to the synchronization information, and further the first wireless network device may determine a start time of a next synchronization period, and receive subsequent information at a start time of a corresponding subframe.

In this way, time-domain symbol synchronization is performed, so that a start time of a next synchronization period may be determined, and subsequent information may be received at a start time of a corresponding subframe.

With reference to the tenth possible implementation of the first aspect, in an eleventh possible implementation of the first aspect, the determining a symbol location of the synchronization information includes: obtaining, by the first wireless network device, the beam identifier or a synchronization information index in the synchronization information; and determining, by the first wireless network device, the symbol location of the synchronization information according to a preset correspondence between a beam identifier or a synchronization information index and a symbol location.

The first wireless network device may pre-obtain the correspondence between a beam identifier or a synchronization information index and a symbol location, set by the second wireless network device, and after obtaining the beam identifier or the synchronization information index in the synchronization information, determine the symbol location of the synchronization information according to the correspondence.

In this way, the symbol location of the synchronization information may be determined according to the beam identifier or the synchronization information index in the synchronization information.

With reference to the tenth possible implementation of the first aspect, in a twelfth possible implementation of the first aspect, the determining a symbol location of the synchronization information includes: obtaining, by the first wireless network device, the symbol location of the synchronization information from the PBCH broadcast information corresponding to the synchronization information.

After receiving a piece of synchronization information, the first wireless network device may obtain the symbol location of the synchronization information from the PBCH broadcast information corresponding to the synchronization information.

In this way, the symbol location of the synchronization information may be obtained from the PBCH broadcast information corresponding to the synchronization information.

According to a second aspect, a synchronization information transmission method is provided. The method includes sending, by a second wireless network device, synchronization information and synchronization configuration information corresponding to the synchronization information to a first wireless network device, where the synchronization configuration information includes time-domain location information of the synchronization information.

With reference to the second aspect, in a first possible implementation of the second aspect, the synchronization configuration information corresponding to the synchronization information includes RRC signaling and/or PBCH broadcast information.

With reference to the first possible implementation of the second aspect, in a second possible implementation of the second aspect, the RRC signaling and/or the PBCH broadcast information includes indication information of a synchronization period length and a total beam quantity.

With reference to the first possible implementation of the second aspect, in a third possible implementation of the second aspect, the PBCH broadcast information further includes a subframe number of a subframe for the synchronization information.

With reference to the first possible implementation of the second aspect, in a fourth possible implementation of the second aspect, the PBCH broadcast information further includes a symbol location of the synchronization information.

According to a third aspect, a synchronization information identification method is provided. The method includes receiving, by a first wireless network device, synchronization information from a second wireless network device. The method also includes obtaining, by the first wireless network device, a coding sequence in the synchronization information, where the coding sequence is determined based on a cell and/or beam corresponding to the synchronization information and based on whether the synchronization information is in an outer loop time segment or an inner loop time segment. The method also includes determining, by the first wireless network device according to the coding sequence in the synchronization information, whether the synchronization information is in the outer loop time segment or the inner loop time segment.

An existing coding rule may be adjusted, so that a coding sequence in synchronization information in the outer loop time segment is different from a coding sequence in the same synchronization information in the inner loop time segment. The second wireless network device codes the synchronization information by using an adjusted coding rule. After receiving the synchronization information sent by the second wireless network device, the first wireless network device may obtain the coding sequence in the synchronization information. If the coding sequence in the synchronization information is a coding sequence in the synchronization information in the outer loop time segment, the first wireless network device may determine that the synchronization information is in the outer loop time segment, and further send feedback information corresponding to the synchronization information to the second wireless network device.

With reference to the third aspect, in a first possible implementation of the third aspect, a primary synchronization sequence in the coding sequence is determined based on a cell corresponding to the synchronization information and based on whether the synchronization information is in the outer loop time segment or the inner loop time segment; and the determining, by the first wireless network device according to the coding sequence in the synchronization information, whether the synchronization information is in the outer loop time segment or the inner loop time segment includes: determining, by the first wireless network device according to the primary synchronization sequence in the coding sequence in the synchronization information, whether the synchronization information is in the outer loop time segment or the inner loop time segment.

The primary synchronization sequence in the coding sequence may be designed based on the cell corresponding to the synchronization information and based on whether the synchronization information is in the outer loop time segment or the inner loop time segment. Primary synchronization sequences in synchronization information in different time segments have different root indexes. The second wireless network device codes the synchronization information by using the adjusted coding rule. In this way, whether the synchronization information is in the outer loop time segment or the inner loop time segment may be determined according to the primary synchronization sequence in the synchronization information.

With reference to the third aspect, in a second possible implementation of the third aspect, a secondary synchronization sequence in the coding sequence is determined based on the cell corresponding to the synchronization information and based on whether the synchronization information is in the outer loop time segment or the inner loop time segment; and the determining, by the first wireless network device according to the coding sequence in the synchronization information, whether the synchronization information is in the outer loop time segment or the inner loop time segment includes: determining, by the first wireless network device according to the secondary synchronization sequence in the coding sequence in the synchronization information, whether the synchronization information is in the outer loop time segment or the inner loop time segment.

The second wireless network device may design, based on the cell corresponding to the synchronization information and based on whether the synchronization information is in the outer loop time segment or the inner loop time segment, the secondary synchronization sequence in the coding sequence. Different specific coding rules are used for synchronization information in different time segments. Further, after receiving the synchronization information, the first wireless network device may determine, according to the secondary synchronization sequence, whether the synchronization information is in the outer loop time segment or the inner loop time segment.

In this way, whether the synchronization information is in the outer loop time segment or the inner loop time segment may be determined according to the secondary synchronization sequence in the synchronization information.

With reference to the third aspect or the first or the second possible implementation of the third aspect, in a third possible implementation of the third aspect, after the receiving, by a first wireless network device, synchronization information from a second wireless network device, the method further includes: determining, by the first wireless network device, a symbol location of the synchronization information, and performing time-domain symbol synchronization according to the symbol location of the synchronization information.

When a subframe carries multiple pieces of synchronization information, after receiving the synchronization information, the first wireless network device may obtain the symbol location of the synchronization information, that is, determine a specific time corresponding to the synchronization information, and further the first wireless network device may determine a start time of a next synchronization period, and receive subsequent information at a start time of a corresponding subframe.

In this way, time-domain symbol synchronization is performed, so that a start time of a next synchronization period may be determined, and subsequent information may be received at a start time of a corresponding subframe.

With reference to the third possible implementation of the third aspect, in a fourth possible implementation of the third aspect, the determining a symbol location of the synchronization information includes: obtaining, by the first wireless network device, a beam identifier or a synchronization information index in the synchronization information; and determining, by the first wireless network device, the symbol location of the synchronization information according to a preset correspondence between a beam identifier or a synchronization information index and a symbol location.

The first wireless network device may pre-obtain the correspondence between a beam identifier or a synchronization information index and a symbol location, set by the second wireless network device, and after obtaining the beam identifier or the synchronization information index in the synchronization information, determine the symbol location of the synchronization information according to the correspondence.

In this way, the symbol location of the synchronization information may be determined according to the beam identifier or the synchronization information index in the synchronization information.

With reference to the third possible implementation of the third aspect, in a fifth possible implementation of the third aspect, the determining a symbol location of the synchronization information includes: obtaining, by the first wireless network device, the symbol location of the synchronization information from PBCH broadcast information corresponding to the synchronization information.

After receiving a piece of synchronization information, the first wireless network device may obtain the symbol location of the synchronization information from the PBCH broadcast information corresponding to the synchronization information.

In this way, the symbol location of the synchronization information may be obtained from the PBCH broadcast information corresponding to the synchronization information.

According to a fourth aspect, a synchronization information transmission method is provided. The method includes generating, by a second wireless network device, a coding sequence in synchronization information based on a cell and/or beam corresponding to the to-be-sent synchronization information and based on whether the synchronization information is in an outer loop time segment or an inner loop time segment. The method also includes sending, by the second wireless network device, the synchronization information including the coding sequence to a first wireless network device, where the coding sequence is used to determine whether the synchronization information is in the outer loop time segment or the inner loop time segment.

The second wireless network device may code the synchronization information based on an adjusted coding rule, so that a coding sequence in synchronization information in the outer loop time segment is different from a coding sequence in the same synchronization information in the inner loop time segment. After receiving the synchronization information sent by the second wireless network device, the first wireless network device may obtain the coding sequence in the synchronization information. If the coding sequence in the synchronization information is a coding sequence in the synchronization information in the outer loop time segment, the first wireless network device may determine that the synchronization information is in the outer loop time segment, and further send feedback information corresponding to the synchronization information to the second wireless network device.

According to a fifth aspect, a synchronization information identification method is provided. The method includes receiving, by a first wireless network device, synchronization information from a second wireless network device. The method also includes obtaining, by the first wireless network device, indication information in PBCH broadcast information corresponding to the synchronization information, where the indication information is used to indicate whether the synchronization information is in an outer loop time segment or an inner loop time segment. The method also includes determining, by the first wireless network device according to the indication information, whether the synchronization information is in the outer loop time segment or the inner loop time segment.

After receiving the synchronization information sent by the second wireless network device, the first wireless network device may obtain the indication information in the corresponding PBCH broadcast information, determine, according to the indication information, a time segment of the synchronization information, and if the synchronization information is in the outer loop time segment, send the feedback information corresponding to the synchronization information to the second wireless network device.

With reference to the fifth aspect, in a first possible implementation of the fifth aspect, a value of the indication information is 0 or 1. The value 0 or 1 of the indication information indicates whether the synchronization information is in the outer loop time segment or the inner loop time segment, respectively.

In this way, the time segment of the synchronization information may be identified by using information of a quite small data volume.

With reference to the fifth aspect or the first possible implementation of the fifth aspect, in a second possible implementation of the fifth aspect, after the receiving, by a first wireless network device, synchronization information from a second wireless network device, the method further includes: determining, by the first wireless network device, a symbol location of the synchronization information, and performing time-domain symbol synchronization according to the symbol location of the synchronization information.

When a subframe carries multiple pieces of synchronization information, after receiving the synchronization information, the first wireless network device may obtain the symbol location of the synchronization information, that is, determine a specific time corresponding to the synchronization information, and further the first wireless network device may determine a start time of a next synchronization period, and receive subsequent information at a start time of a corresponding subframe.

In this way, time-domain symbol synchronization is performed, so that a start time of a next synchronization period may be determined, and subsequent information may be received at a start time of a corresponding subframe.

With reference to the second possible implementation of the fifth aspect, in a third possible implementation of the fifth aspect, the determining a symbol location of the synchronization information includes: obtaining, by the first wireless network device, a beam identifier or a synchronization information index in the synchronization information; and determining, by the first wireless network device, the symbol location of the synchronization information according to a preset correspondence between a beam identifier or a synchronization information index and a symbol location.

The first wireless network device may pre-obtain the correspondence between a beam identifier or a synchronization information index and a symbol location, set by the second wireless network device, and after obtaining the beam identifier or the synchronization information index in the synchronization information, determine the symbol location of the synchronization information according to the correspondence.

In this way, the symbol location of the synchronization information may be determined according to the beam identifier or the synchronization information index in the synchronization information.

With reference to the second possible implementation of the fifth aspect, in a fourth possible implementation of the fifth aspect, the determining a symbol location of the synchronization information includes: obtaining, by the first wireless network device, the symbol location of the synchronization information from PBCH broadcast information corresponding to the synchronization information.

After receiving a piece of synchronization information, the first wireless network device may obtain the symbol location of the synchronization information from the PBCH broadcast information corresponding to the synchronization information.

In this way, the symbol location of the synchronization information may be obtained from the PBCH broadcast information corresponding to the synchronization information.

According to a sixth aspect, a synchronization information transmission method is provided. The method includes sending, by a second wireless network device, synchronization information to a first wireless network device, and adding indication information to PBCH broadcast information corresponding to the synchronization information, where the indication information is used to indicate whether the synchronization information is in an outer loop time segment or an inner loop time segment.

With reference to the sixth aspect, in a first possible implementation of the sixth aspect, a symbol location of the synchronization information is added to the PBCH broadcast information corresponding to the synchronization information.

According to a seventh aspect, a wireless network device is provided, where the wireless network device includes a receiver, a processor, and a transmitter. The processor is configured to control the receiver and the transmitter to perform signal reception and transmission, respectively. When the processor executes synchronization information identification, the wireless network device is configured to implement the method according to any one of the first aspect or all the possible implementations of the first aspect, or the method according to any one of the third aspect or all the possible implementations of the third aspect, or the method according to any one of the fifth aspect or all the possible implementations of the fifth aspect.

According to an eighth aspect, a wireless network device for synchronization information transmission is provided, where the wireless network device includes a processor and a transmitter. The processor is configured to control the transmitter to perform signal transmission; and when the processor executes synchronization information identification, the wireless network device is configured to implement the method according to any one of the second aspect or all the possible implementations of the second aspect, or the method according to any one of the fourth aspect or all the possible implementations of the fourth aspect, or the method according to any one of the sixth aspect or all the possible implementations of the sixth aspect.

The technical solutions provided in the embodiments disclosed may include the following beneficial effects.

According to the embodiments disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; and the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
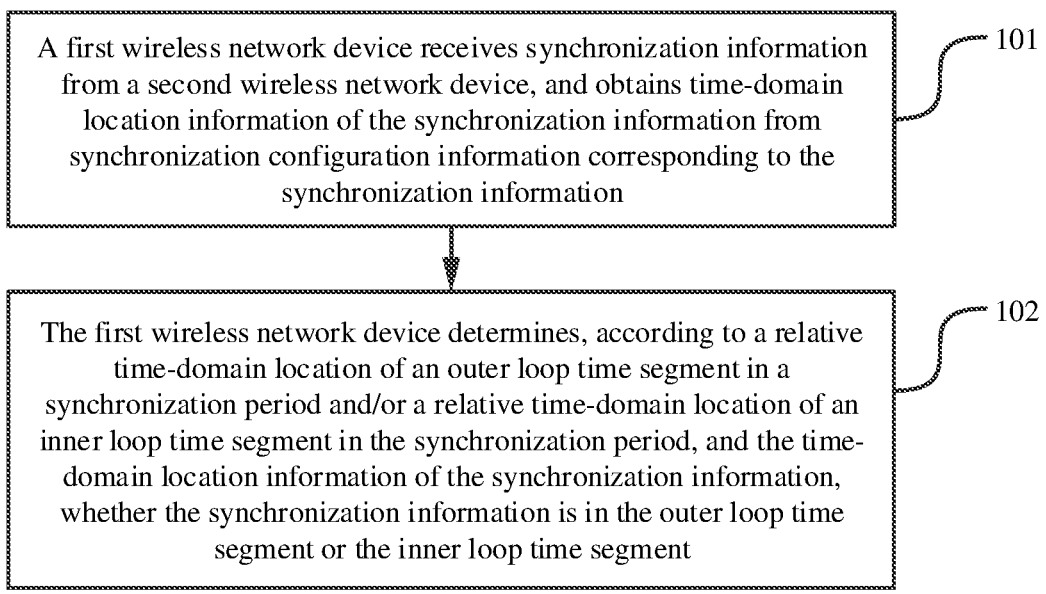
FIG. 1 is a flowchart of a synchronization information identification method according to an embodiment of this application.

As described in this application, terms "component", "module", "system", or the like are used to represent a computer-related entity. The computer-related entity may be hardware, firmware, a combination of hardware and software, software, or running software. For example, a component may be, but is not limited to, a process that runs on a processor, a processor, an object, an executable file, a thread of execution, a program, and/or a computer. As an example, both a computing device and an application that runs on a computing device may be components. One or more components may reside within a process and/or a thread of execution, and a component may be located on one computer and/or distributed between two or more computers. In addition, these components may be executed from various computer-readable media that have various data structures. These components may perform communication with each other in a local and/or remote manner by using signals of one or a plurality of data packets (for example, data from a component, where the component interacts with another component in a local system or a distributed system and/or interacts with another system by means of signals over a network such as the Internet).

In addition, this application describes all aspects with reference to a wireless network device. The wireless network device may be a base station. The base station may be configured to communicate with one or a plurality of user equipment, or communicate with one or a plurality of base stations having some functions of user equipment (for example, communication performed between a macro base station and a micro base station such as an access point). The wireless network device may alternatively be user equipment. The user equipment may be configured to perform communication with one or a plurality of user equipment (for example, D2D communication), or may be configured to perform communication with one or a plurality of base stations. The user equipment may be alternatively referred to as a user terminal, and may include some or all functions of a system, a subscriber unit, a subscriber station, a mobile station, a mobile wireless station, a mobile device, a node, a device, a remote station, a remote terminal, a terminal, a wireless communications device, a wireless communications apparatus, or a user agent. The user equipment may be a cellular phone, a cordless phone, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device used in a wireless system for communication. The base station may be alternatively referred to as an access point, a node, a NodeB, an evolved NodeB (eNB), or another network entity, and may include some or all functions of the foregoing network entities. The base station may perform communication with a wireless terminal over an air interface. The communication may be implemented by using one or more sectors. The base station may convert a received air interface frame into an IP packet, and serve as a router between a wireless terminal and a remaining part of an access network. The access network includes an Internet Protocol (IP) network. The base station may further perform coordination for air interface attribute management, and may be a gateway between a wired network and a wireless network. The wireless network device may include a receiver, a processor, and a transmitter. Both the receiver and the transmitter may be connected to the processor. The receiver may be configured to receive a signal. The receiver may include but is not limited to one or more of an antenna, one or more oscillators, a coupler, a low noise amplifier (low noise amplifier, LNA), a duplexer, an analog-to-digital converter, a frequency converter, or other hardware. The transmitter may be configured to send a signal. The transmitter may include but is not limited to one or more pieces of an antenna, one or more oscillators, a coupler, a power amplifier (power amplifier, PA), a duplexer, a digital-to-analog converter, a frequency converter, or other hardware. The transmitter and the receiver may be collectively referred to as a transceiver, and hardware included in the transmitter and the receiver may be shared according to an actual requirement. In this application, the processor may be configured to perform related processing, for example, receive or send a message. The processor may include one or more processing units. The processor may be a general-purpose processor, including a central processing unit (CPU), a network processor (NP), or the like. The processor may be alternatively a digital signal processor (DSP), an application-specific integrated circuit (ASIC), a field programmable gate array (FPGA), or another programmable logic device. Specifically, a program may include program code, and the program code includes a computer operation instruction.

In this application, each aspect, embodiment, or characteristic is described by using a system that may include multiple devices, components, modules, or the like, to represent aspects, embodiments, or characteristics. It should be understood and noted that, each system may include another device, component, module, or the like, and/or may not include all devices, components, modules, and the like that are described with reference to the accompanying drawings. In addition, a combination of these solutions may also be used.

In addition, in the embodiments of this application, "example" is used to represent an instance, illustration, or a description. In this application, any embodiment or design solution described as an "example" shall not be construed as to be more preferential or advantageous than other embodiments or design solutions. Exactly, the use of the term "example" is intended to describe a concept in a specific manner.

In the embodiments of this application, information, signal, message, and channel may be used interchangeably sometimes. It should be noted that, meanings conveyed by the foregoing terms are the same unless a difference needs to be emphasized. "Of", "relevant", and "corresponding" may be used interchangeably sometimes. It should be noted that, meanings conveyed by the foregoing terms are the same unless a difference needs to be emphasized.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may understand that, with the evolution of the network architecture and emergence of a new service scenario, the technical solutions provided in the embodiments of this application are also applicable to a similar technical problem.

The embodiments of this application may be applied to a time division duplex (TDD) scenario, and may also be applicable to a frequency division duplex (FDD) scenario.

The embodiments of this application may be used in a single carrier system or a multicarrier system, and may be used in a high frequency system (with a frequency band higher than 6 GHz) or low frequency communications system (with a frequency band lower than 6 GHz).

The embodiments of this application are described based on a 4G network scenario in a wireless communications network. It should be noted that, the solutions of the embodiments of this application may also be applied to another wireless communications network, and a corresponding name may be replaced with a corresponding function name in the another wireless communications network. With reference to a specific implementation, the following describes a procedure of a synchronization information identification method shown in FIG. 1.

Step 101: A first wireless network device receives synchronization information from a second wireless network device, and obtains time-domain location information of the synchronization information from synchronization configuration information corresponding to the synchronization information.

Step 102: The first wireless network device determines, according to a relative time-domain location of an outer loop time segment in a synchronization period and/or a relative time-domain location of an inner loop time segment in the synchronization period, and the time-domain location information of the synchronization information, whether the synchronization information is in the outer loop time segment or the inner loop time segment.

Optionally, the method may further include the following.

Step 103: If the synchronization information is in the outer loop time segment, the first wireless network device sends feedback information corresponding to the synchronization information to the second wireless network device.

The synchronization information may be information used by the first wireless network device to perform time-frequency synchronization with the second wireless network device. The time-domain location information may be a frame number of a radio frame for the synchronization information. The synchronization configuration information may be information, corresponding to the synchronization information, for radio communication resource configuration, such as physical broadcast channel broadcast information (PBCH).

Figure 2:
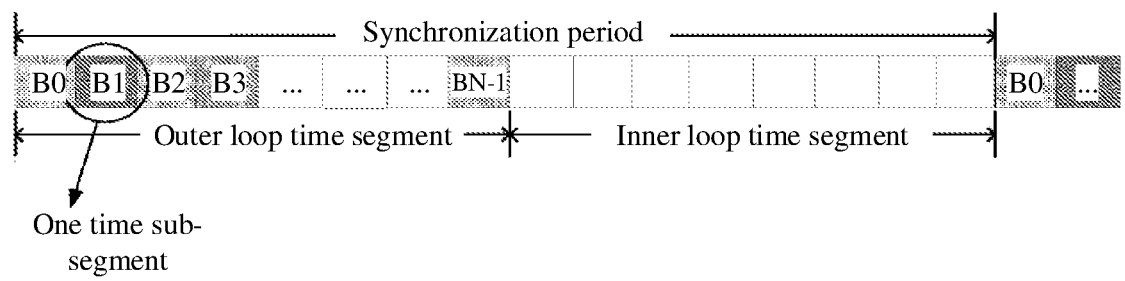
FIG. 2 is a schematic diagram of a synchronization period according to the embodiment of this application.
Figure 3:
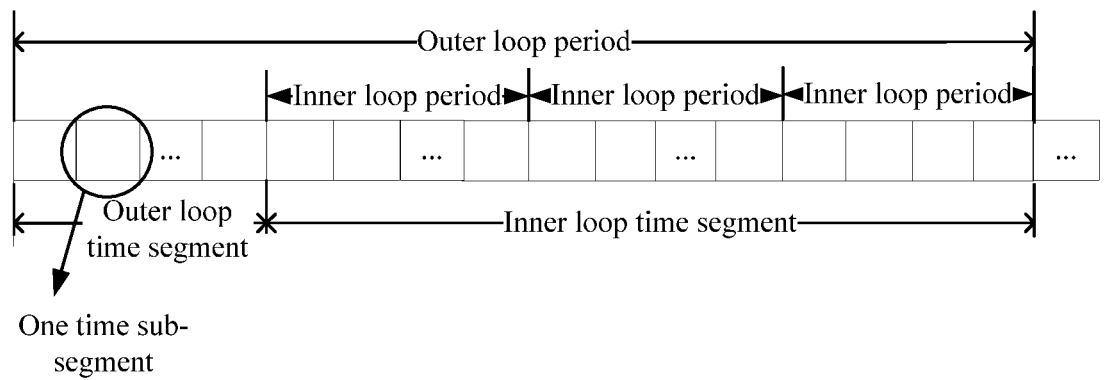
FIG. 3 is a schematic diagram of an outer loop period and an inner loop period according to the embodiment of this application.

In an example of step 101, the second wireless network device may preset the synchronization period. A former part of each synchronization period is set as the outer loop time segment, and a latter part of the synchronization period is set as the inner loop time segment. The outer loop time segment may be further divided into a plurality of time sub-segments. A time sub-segment may be a communications time unit such as a radio frame, a subframe, or multiple symbols. Each time sub-segment is corresponding to a cell or a beam served by the second wireless network device. A cell may include multiple different beams (a beam is used as a unit unless otherwise specified in this application). As shown in FIG. 2, each grid is corresponding to a radio frame, and B0, B1, . . . , BN−1 may be corresponding to different cells or beams, respectively. The second wireless network device may send, in an outer loop time segment of each synchronization period according to the preset synchronization period, the synchronization information by using a beam to each cell or beam served by the second wireless network device. If the first wireless network device is within signal coverage of the second wireless network device, and an antenna of the first wireless network device retains in a state of being ready to receive a signal, the first wireless network device may search for and receive the synchronization information broadcast by the second wireless network device. Further, the first wireless network device may obtain the time-domain location information of the synchronization information, that is, the frame number of the radio frame for the synchronization information. Herein, the synchronization configuration information and the synchronization information may be at a same time-domain location, for example, in a same radio frame or a same subframe. Alternatively, the synchronization configuration information and the synchronization information are sent by using a same beam. In addition, one piece of synchronization information may be corresponding to one piece of synchronization configuration information, or multiple pieces of synchronization information may be corresponding to one piece of synchronization configuration information. It should be noted that, a synchronization period may be referred to as an outer loop period, the outer loop period includes an outer loop time segment and an inner loop time segment, and the inner loop time segment may include a plurality of inner loop periods, as shown in FIG. 3.

In step 102, the relative time-domain location may be a corresponding specific time segment of the outer loop time segment or the inner loop time segment in the synchronization period, and may be specifically represented as a frame number of a corresponding radio frame.

In a possible implementation, after obtaining the frame number of the radio frame for the synchronization information, the first wireless network device may determine, according to the frame numbers of the radio frames corresponding to the outer loop time segment and the inner loop time segment in the synchronization period, whether the frame number of the radio frame for the synchronization information is a frame number of a radio frame in the outer loop time segment or a frame number of a radio frame in the inner time segment, so as to determine whether the synchronization information is in the outer loop time segment or the inner loop time segment. For example, if the frame numbers of the radio frames in the outer loop time segment are 1 to 5, the frame numbers of the radio frames in the inner loop time segment are 5 to 40, and the frame number of the radio frame for the synchronization information is 4, it can be determined that the radio frame is in the outer loop time segment, and further it can be determined that the synchronization information is in the outer loop time segment.

Optionally, the first wireless network device may determine the relative time-domain location of the outer loop time segment in the synchronization period and/or the relative time-domain location of the inner loop time segment in the synchronization period according to a length of the synchronization period and a total beam quantity.

Figure 4:
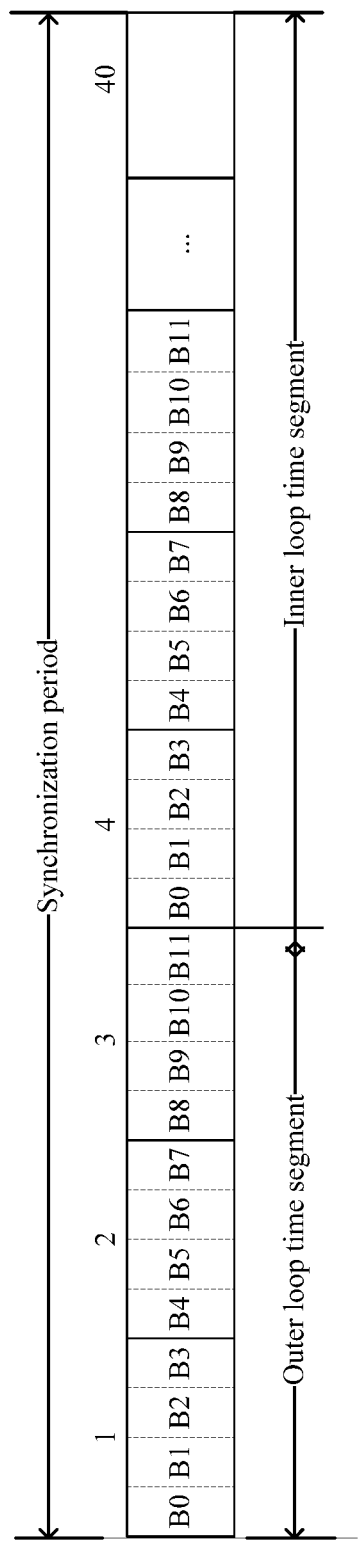
FIG. 4 is a schematic diagram of relative time-domain locations of an outer loop time segment and an inner loop time segment according to the embodiment of this application.

During implementation, if the length of the synchronization period is T, a length of a radio frame is $T_{rf}$, and a length of a subframe is $T_{sf}$, it can be determined that the synchronization period includes $N_{rf}=T/T_{rf}$ radio frames, and that the radio frame includes $N_{sf}=T/T_{sf}$ subframes. In addition, if the total beam quantity is N, and each radio frame may carry synchronization information of K beams, for a frame number $n_{rf}$ of the radio frame, if $n_{rf}$ is greater than or equal to $k \cdot N_{rf}$ and less than $k \cdot N_{rf}+(N/K)$, where k is a natural number (in this embodiment, a frame number includes 0, and k also includes 0 correspondingly), the radio frame is in the outer loop time segment; otherwise, if $n_{rf}$ is less than $k \cdot N_{rf}$ or greater than or equal to $k \cdot N_{rf}+(N/K)$, the radio frame is in the inner loop time segment. For example, the total beam quantity is 12, the length of the synchronization period is 40 ms, each radio frame has a length of 1 ms, and the synchronization period includes 40 radio frames. In addition, it can be set in a protocol or pre-notified to first wireless network device that each radio frame carries synchronization information of four beams. The relative time-domain location of the outer loop time segment in the synchronization period is: First three radio frames in each synchronization period are in the outer loop time segment, and/or the relative time-domain location of the inner loop time segment in the synchronization period is last 37 radio frames are in the inner loop time segment, as shown in FIG. 4.

Optionally, the first wireless network device may obtain the length of the synchronization period and the total beam quantity in multiple manners, and three feasible manners are provided as follows:

Manner 1: Determine the relative time-domain location of the outer loop time segment in the synchronization period and/or the relative time-domain location of the inner loop time segment in the synchronization period according to a preset synchronization period length and a preset total beam quantity.

Manner 2: Determine the relative time-domain location of the outer loop time segment in the synchronization period and/or the relative time-domain location of the inner loop time segment in the synchronization period according to indication information that is of the length of the synchronization period and the total beam quantity and that is included in radio resource control (RRC) signaling.

Manner 3: Determine the relative time-domain location of the outer loop time segment in the synchronization period and/or the relative time-domain location of the inner loop time segment in the synchronization period according to indication information that is of the length of the synchronization period and the total beam quantity and that is included in PBCH broadcast information.

The length of the synchronization period and the total beam quantity may be separately obtained in different manners. The indication information may be a specific synchronization period length and a specific total beam quantity, or may be other information used to determine the length of the synchronization period and the total beam quantity.

It can be understood that, when the beam quantity K corresponding to the synchronization information carried in each radio frame is pre-notified to the first wireless network device, the method further includes obtaining the value K by the first wireless network device.

Optionally, a radio frame in the inner loop time segment may be referred to as an inner loop radio frame, and a radio frame in the outer loop time segment may be referred to as an outer loop radio frame. Correspondingly, processing in step 103 may be as follows. The first wireless network device determines, according to a relative time-domain location of the outer loop radio frame in the synchronization period and/or a relative time-domain location of the inner loop radio frame in the synchronization period, and the time-domain location information of the synchronization information, whether the radio frame for the synchronization information is the outer loop radio frame or the inner loop radio frame; and if the radio frame for the synchronization information is the outer loop radio frame, determines that the synchronization information is in the outer loop time segment; or if the radio frame for the synchronization information is the inner loop radio frame, determines that the synchronization information is in the inner loop time segment.

Optionally, when a radio frame includes both the outer loop time segment and the inner loop time segment, a time segment for a subframe in the radio frame needs to be further determined. Corresponding processing may be as follows: If the first wireless network device determines, according to the relative time-domain location of the outer loop radio frame in the synchronization period and the relative time-domain location of the inner loop radio frame in the synchronization period, and the time-domain location information of the synchronization information, that the radio frame for the synchronization information is a hybrid radio frame, the first wireless network device obtains a beam identifier in the synchronization information, where the hybrid radio frame is a radio frame including a part of the outer loop time segment and a part of the inner loop time segment; the first wireless network device determines, according to a preset beam identifier corresponding to the outer loop time segment and a preset beam identifier corresponding to the inner loop time segment in the hybrid radio frame, and the beam identifier in the synchronization information, whether the synchronization information is in the outer loop time segment or the inner time segment.

Figure 5:
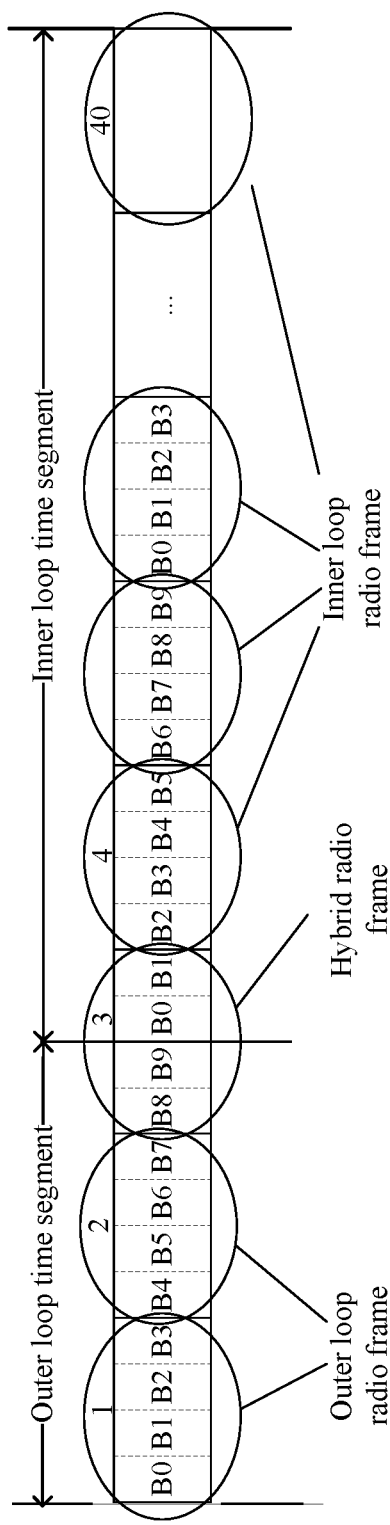
FIG. 5 is a schematic diagram of an outer loop radio frame, an inner loop radio frame, and a hybrid radio frame according to the embodiment of this application.

During implementation, if a radio frame includes both a part of the inner loop time segment and a part of the outer loop time segment, it is considered that the radio frame is a hybrid radio frame. Specifically, it may be predefined that, the synchronization period is T, a length of the radio frame is $T_{rf}$, the synchronization period includes $N_{rf}=T/T_{rf}$ radio frames, the total beam quantity is N, and the frame number of the radio frame is $n_{rf}$. Each radio frame may carry synchronization information of K beams. First, it is determined, according to a frame number of the radio frame, whether the radio frame is the outer loop radio frame, the inner loop radio frame, or the hybrid radio frame. If $n_{rf}$ is greater than or equal to $k \cdot N_{rf}$ and less than $k \cdot N_{rf} + \lfloor N/K \rfloor$, it is determined that the radio frame is the outer loop radio frame; and if $n_{rf}$ is equal to $k \cdot N_{rf} + \lfloor N/K \rfloor$, it is determined that the radio frame is the hybrid radio frame. Herein, "$\lfloor \ \rfloor$" is a round down symbol, and k is a natural number (in this embodiment, a frame number includes 0, and k also includes 0 correspondingly). For example, the total beam quantity is 10, and the synchronization period has 40 radio frames. It is set that each radio frame carries synchronization information of four beams, and the relative time-domain location of the outer loop time segment in the synchronization period and the relative time-domain location of the inner loop time segment in the synchronization period are: First two radio frames are outer loop radio frames, last 37 radio frames are inner loop radio frames, and a third radio frame is a hybrid radio frame, as shown in FIG. 5. After determining the length of the synchronization period and the total beam quantity, the first wireless network device may determine whether there is the hybrid radio frame. Then, after obtaining the frame number of the radio frame for the synchronization information, the first wireless network device may determine, according to the frame numbers of the radio frames corresponding to the outer loop radio frame and the inner loop radio frame in the synchronization period, whether the frame number of the radio frame for the synchronization information is a frame number of the radio frame in the outer loop time segment, a frame number of the radio frame in the inner loop time segment, or a frame number of the hybrid radio frame. If determining that the frame number of the radio frame for the received synchronization information is the frame number of the hybrid radio frame, the first wireless network device may determine that the radio frame for the received synchronization information is the hybrid radio frame, and further the first wireless network device may obtain the beam identifier in the synchronization information.

The second wireless network device may preset the beam identifier corresponding to the outer loop time segment and the beam identifier corresponding to the inner loop time segment in the hybrid radio frame, that is, set a correspondence between inner and outer loop time segments and beam identifiers in synchronization information that is sent in the hybrid radio frame. In an optional solution, a subframe corresponding to synchronization information that is sent in the inner loop time segment is fixed. For example, synchronization information with beam identifiers 8 and 9 are corresponding to the outer loop time segment, and synchronization information with beam identifiers 0 and 1 are corresponding to the inner loop time segment. Therefore, the first wireless network device may determine, according to the beam identifier in the synchronization information and the correspondence, whether the synchronization information is in the outer loop time segment or the inner loop time segment.

Optionally, a time segment of the synchronization information may be determined according to the subframe number of the subframe for the synchronization information. Corresponding processing may be as follows: If it is determined, according to the relative time-domain location of the outer loop radio frame in the synchronization period and/or the relative time-domain location of the inner loop radio frame in the synchronization period, and the time-domain location information of the synchronization information, that the radio frame for the synchronization information is the hybrid radio frame, the first wireless network device obtains the subframe number of the subframe for the synchronization information; and the first wireless network device determines, according to a preset subframe number corresponding to the outer loop time segment in the hybrid radio frame, a preset subframe number corresponding to the inner loop time segment in the hybrid radio frame, and the subframe number of the subframe for the synchronization information, that the synchronization information is in the outer loop time segment or the inner loop time segment.

During implementation, after obtaining the frame number of the radio frame for the synchronization information, the first wireless network device may determine, according to the frame numbers of the radio frames corresponding to the outer loop radio frame and the inner loop radio frame in the synchronization period, whether the frame number of the radio frame for the synchronization information is the frame number of the radio frame in the outer loop time segment, the frame number of the radio frame in the inner loop time segment, or the frame number of the hybrid radio frame. If determining that the frame number of the radio frame for the received synchronization information is the frame number of the hybrid radio frame, the first wireless network device may determine that the radio frame for the synchronization information is the hybrid radio frame.

The second wireless network device may preset the subframe number corresponding to the outer loop time segment and the subframe number corresponding to the inner loop time segment in the hybrid radio frame, that is, set a correspondence between inner and outer loop time segments and subframe numbers in synchronization information that is sent in the hybrid radio frame. In an optional solution, a subframe corresponding to synchronization information that is sent in the inner loop time segment is fixed. For example, synchronization information corresponding to subframe numbers 0 and 1 is in the outer loop time segment, and synchronization information corresponding to subframe numbers 2 and 3 is in the inner loop time segment. Therefore, the first wireless network device may determine, according to the subframe number of the subframe for the synchronization information and the correspondence, whether the synchronization information is in the outer loop time segment or the inner loop time segment.

Optionally, the first wireless network device may obtain the subframe number in multiple manners, and two feasible manners are provided as follows.

Manner 1: Obtain, from PBCH broadcast information corresponding to the synchronization information, the subframe number of the subframe for the synchronization information.

During implementation, the second wireless network device may send, on a PBCH broadcast information channel corresponding to each piece of synchronization information, the PBCH broadcast information corresponding to the synchronization information. After receiving a piece of synchronization information, the first wireless network device may obtain, from the PBCH broadcast information corresponding to the synchronization information, the subframe number of the subframe for the synchronization information. For example, a subframe number identifier may be added to a master information block, to indicate the subframe number. For example, subframes 0 to 4 are corresponding to synchronization information in the outer loop time segment, and subframes 5 to 9 are corresponding to synchronization information in the inner loop time segment.

Manner 2: Determine, according to a preset beam identifier corresponding to the outer loop time segment in the hybrid radio frame, a preset beam identifier corresponding to the inner loop time segment in the hybrid radio frame, and the beam identifier in the synchronization information, the subframe number of the subframe for the synchronization information.

During implementation, a correspondence between inner and outer loop time segments and beam identifiers in synchronization information may be preset in the second wireless network device. In this way, after obtaining the beam identifier in the synchronization information, the first wireless network device may determine the subframe number of the subframe for the synchronization information according to the correspondence. For example, in an outer loop radio frame, a subframe for a beam 0 and a beam 4 is a subframe 0, a subframe for a beam 1 and a beam 5 is a subframe 3, a subframe for a beam 2 and a beam 6 is a subframe 5, and a subframe for a beam 3 and a beam 7 is a subframe 8. In a hybrid radio frame, a subframe for an outer loop beam 8 is a subframe 0, a subframe for an outer loop beam 9 is a subframe 3, a subframe for an inner loop beam 0 is a subframe 5, and a subframe for an inner loop beam 1 is a subframe 8. In an inner loop radio frame, a subframe for a beam 2 and a beam 6 is a subframe 0, a subframe for a beam 3 and a beam 7 is a subframe 3, a subframe for a beam 4 and a beam 8 is a subframe 5, and a subframe for a beam 5 and a beam 9 is a subframe 8.

Figure 6:
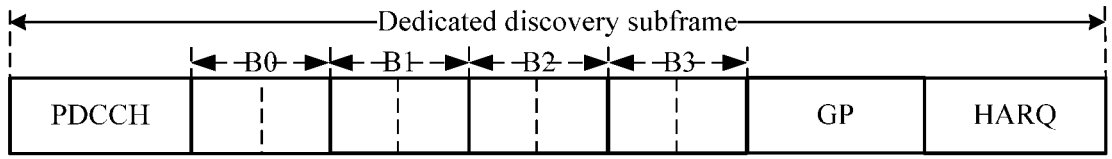
FIG. 6 is a schematic diagram of a dedicated discovery subframe according to the embodiment of this application.

In step 103, if the first wireless network device determines that the received synchronization information is in the outer loop time segment, the first wireless network device may send the feedback information to the second wireless network device on an uplink resource configured in a current synchronization period. The feedback information is corresponding to the synchronization information, that is, the feedback information carries a beam identifier carried in the synchronization information. Alternatively, time-domain location information of the feedback information is corresponding to the time-domain location information of the synchronization information, so that the second wireless network device learns that that there is a requirement for sending subsequent information in a beam direction of the synchronization information. Optionally, a dedicated discovery subframe is used to send the synchronization information in the outer loop time segment. The dedicated discovery subframe may be used to send multiple pieces of synchronization information, and such a subframe is referred to as the dedicated discovery subframe. FIG. 6 is a possible schematic structural diagram of the dedicated discovery subframe. One dedicated discovery subframe may be used to send four pieces of synchronization information, and each piece of synchronization information occupies two symbol locations. Further, the dedicated discovery subframe may further include the following information: a physical downlink control channel (PDCCH), a guard period (GP), and a hybrid automatic repeat request (HARQ). The PDCCH occupies one to three symbol locations, and is used to transmit downlink control information to a wireless network device, such as an uplink scheduling instruction, a downlink data transmission indication, and common control information. The downlink control information includes resource allocation information, a transmission format, power control information, a frequency hopping type, a transmission mode, and other control information. The guard period occupies one to three symbol locations and is a time point at which downlink transmission is complete and uplink transmission is to start, to prevent interference caused by a downlink signal to an uplink signal. The HARQ occupies one or two symbol locations, and is used to ensure that a receiving party stores received data when decoding fails, and instructs an information sending party to retransmit data, and the receiving party combines the retransmitted data with previously received data and performs decoding. It can be understood that, these configuration information about how many pieces of synchronization information is specifically included in the dedicated discovery subframe, whether one or more of the PDCCH, the GP, or the HARQ are included, how many symbol locations are occupied by the PDCCH, the GP, or the HARQ, or the like may be specifically designed and determined according to a system requirement. After the configuration information is determined, the configuration information may be preconfigured in the sending party and the receiving party, or the configuration information is sent by the sending party to the receiving party. For a specific sending manner, refer to an existing manner. Details are not repeated herein.

Optionally, in a possible implementation, the first wireless network device may be a terminal, and the second wireless network device may be a base station.

Based on the same concept, the embodiment of this application further provides a synchronization information identification system. The system provided in this embodiment can implement the procedure of the embodiment of this application shown in FIG. 1. For specific processing, refer to related content of step 101 to step 103. Correspondingly, the system may include the first wireless network device and the second wireless network device that implement the procedure of the embodiment shown in FIG. 1. Details are not repeated herein.

Figure 7:
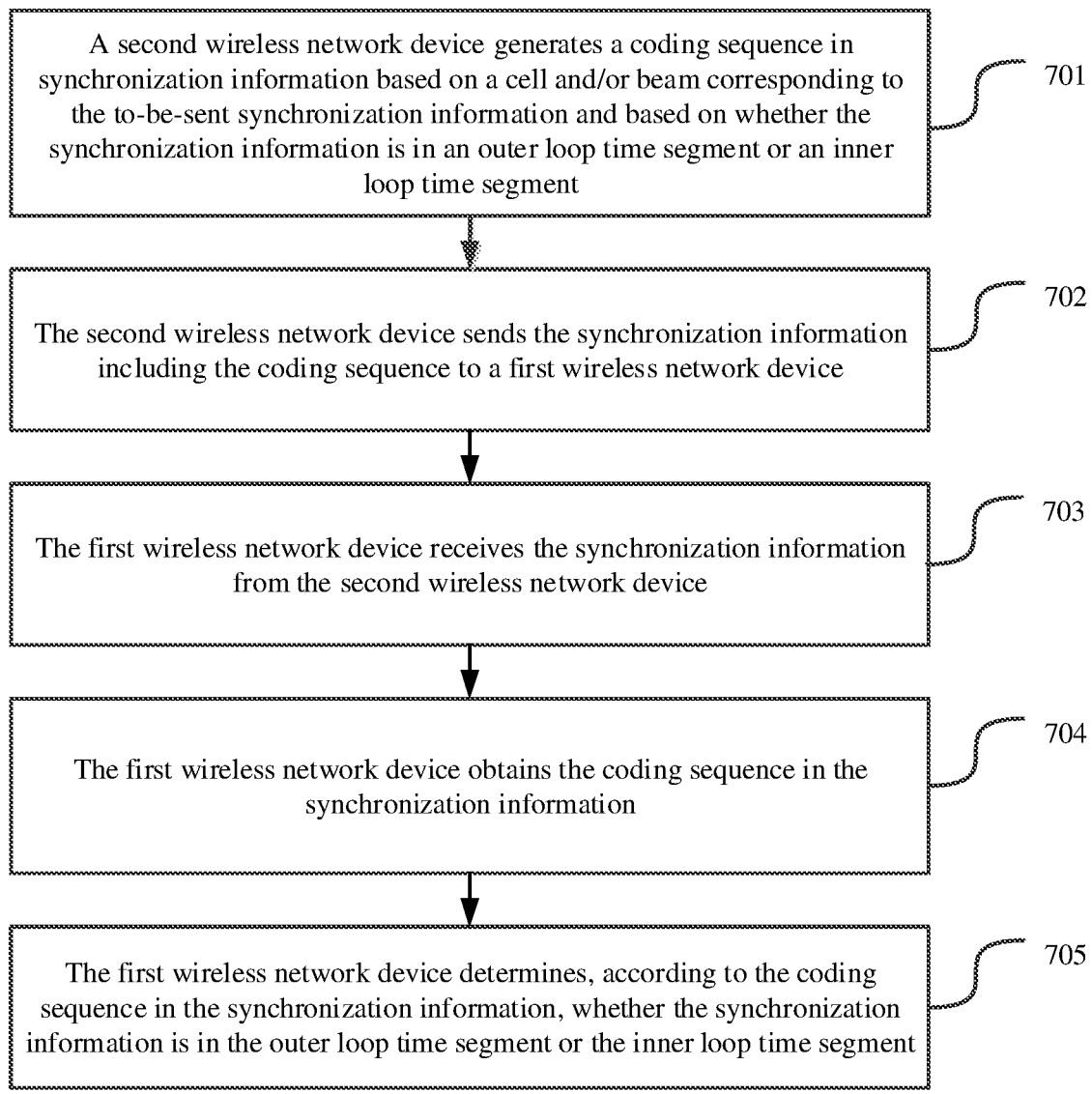
FIG. 7 is a flowchart of a synchronization information identification method according to the embodiment of this application.

The embodiment further provides a synchronization information identification method. A specific procedure is shown in FIG. 7, and implementation content may be as follows.

Step 701: A second wireless network device generates a coding sequence in synchronization information based on a cell and/or beam corresponding to the to-be-sent synchronization information and based on whether the synchronization information is in an outer loop time segment or an inner loop time segment.

During implementation, the second wireless network device may design different coding sequences in the synchronization information in the outer loop time segment and the inner loop time segment, that is, modify a coding rule of synchronization information in a related technology, and set different coding parameters for the coding sequences in the synchronization information in the outer loop time segment and the inner loop time segment, so that coding sequences in synchronization information of a same cell and/or beam in different time segments are different.

Step 702: The second wireless network device sends the synchronization information including the coding sequence to a first wireless network device.

Step 703: The first wireless network device receives the synchronization information sent by the second wireless network device.

Step 704: The first wireless network device obtains the coding sequence in the synchronization information.

Step 705: The first wireless network device determines, according to the coding sequence in the synchronization information, whether the synchronization information is in the outer loop time segment or the inner loop time segment.

Optionally, step 706 may be further included: If the synchronization information is in the outer loop time segment, the first wireless network device sends feedback information corresponding to the synchronization information to the second wireless network device.

During implementation, specifically, in an existing 3GPP Long Term Evolution (LTE), the synchronization information includes primary synchronization information and secondary synchronization information. In a given cell, a specific sequence of a primary synchronization signal (PSS) and a specific sequence of a secondary synchronization signal (SSS) are transmitted, and are used to indicate a physical layer cell identifier. In LTE, there are 504 different physical layer cell identifiers that are divided into 168 groups, each group including three identifiers. Three PSS sequences are used to represent a physical layer identifier $N_{ID}^{(2)}$ of a physical layer cell identifier group, and 168 SSS sequences are used to represent a physical layer cell identifier group $N_{ID}^{(1)}$. The PSS is a frequency-domain ZC (Zadoff-Chu) sequence with a length of 63, three PSS sequences are corresponding to three physical layer identifiers of each cell identifier group, and root indexes u of the ZC sequence are 25, 29, and 34, as shown in Table 1. A specific generated sequence is shown in a formula (1):

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (1)$$

TABLE 1

Root indexes of primary synchronization information

| $N_{ID}^{(2)}$ | Root index u |
|---|---|
| 0 | 25 |
| 1 | 29 |
| 2 | 34 |

The SSS sequence includes two staggered M sequences with a length of 31. The two M sequences SSC1 and SSC2 are generated from a same M sequence with a length of 31 by means of different cyclic shifts. The SSS sequence is obtained by scrambling a PSS and PSS-related code, as shown in a formula (2) specifically:

$$d(2n) = \begin{cases} s_0^{(m_0)}(n)c_0(n) & \text{in subframe } 0 \\ s_1^{(m_1)}(n)c_0(n) & \text{in subframe } 5 \end{cases} \quad (2)$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

where $0 \le n \le 30$, $m_0$ and $m_1$ are generated according to the physical layer cell identifier group $N_{ID}^{(1)}$; for details, refer to Table 2; and formula deduction is shown in a formula (3):

$$m_0 = m' \bmod 31 \quad (3)$$
$$m_1 = (m_0 + \lfloor m'/31 \rfloor + 1) \bmod 31$$
$$m' = N_{ID}^{(1)} + q(q+1)/2, \quad q = \left\lfloor \frac{N_{ID}^{(1)} + q'(q'+1)/2}{30} \right\rfloor,$$
$$q' = \left\lfloor \frac{N_{ID}^{(1)}}{30} \right\rfloor$$

The two sequences $s_0^{(m_0)}(n)$ and $s_1^{(m_1)}(n)$ are two different cyclic shifts of an m-sequences $\tilde{s}(n)$, and are generated according to the following formula:

$$s_0^{(m_0)}(n) = \tilde{s}((n+m_0) \bmod 31)$$

$$s_1^{(m_2)}(n) = \tilde{s}((n+m_1) \bmod 31) \quad (4)$$

where $\tilde{s}(i) = 1 - 2x(i)$, $0 \le i \le 30$, and $x(i)$ is defined as follows:

$$x(\bar{i}+5) = (x(\bar{i}+2) + x(\bar{i})) \bmod 2, \quad 0 \le \bar{i} \le 25 \quad (5)$$

An initial condition is $x(0)=0$, $x(1)=0$, $x(2)=0$, $x(3)=0$, $x(4)=1$.

Two scrambling sequences $c_0(n)$ and $c_1(n)$ are two different cyclic shifts of an m-sequence $\tilde{c}(n)$, and are generated according to the primary synchronization information and the following formulas:

$$c_0(n) = \tilde{c}((n + N_{ID}^{(2)}) \bmod 31)$$

$$c_1(n) = \tilde{c}((n + N_{ID}^{(2)} + 3) \bmod 31) \quad (6)$$

where $N_{ID}^{(2)} \in \{0,1,2\}$ is the physical layer identifier in the physical layer cell identifier group; $\tilde{c}(i) = 1 - 2x(i)$ and $0 \le i \le 30$; and $x(i)$ is defined as follows:

$$x(\bar{i}+5) = (x(\bar{i}+3) + x(\bar{i})) \bmod 2, \quad 0 \le \bar{i} \le 25 \quad (7)$$

An initial condition is $x(0)=0$, $x(1)=0$, $x(2)=0$, $x(3)=0$, $x(4)=1$.

Scrambling sequences $z_1^{(m_0)}(n)$ and $z_1^{(m_1)}(n)$ are a cyclic shift of an m-sequence, where specific formulas are as follows:

$$z_1^{(m_0)}(n)=\tilde{z}((n+(m_0 \bmod 8))\bmod 31) \quad (8)$$

$$z_1^{(m_1)}(n)=\tilde{z}((n+(m_1 \bmod 8))\bmod 31) \quad (9)$$

where $m_0$ and $m_1$ are obtained according to Table 2; $\tilde{z}(i)=1-2x(i)$ and $0 \leq i \leq 30$; and $x(i)$ is defined as follows:

$$x(\bar{i}+5)=(x(\bar{i}+4)+x(\bar{i}+2)+x(\bar{i}+1)+x(\bar{i}))\bmod 2, \ 0 \leq \bar{i} \leq 25 \quad (10)$$

An initial condition is $x(0)=0$, $x(1)=0$, $x(2)=0$, $x(3)=0$, $x(4)=1$.

TABLE 2

Mapping relationship between a physical layer cell identifier group $N_{ID}^{(1)}$ and $m_0$ and $m_1$

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |

TABLE 2-continued

Mapping relationship between a physical layer cell identifier group $N_{ID}^{(1)}$ and $m_0$ and $m_1$

| $N_{ID}^{(1)}$ | $m_0$ | $m_1$ |
|---|---|---|
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Different from that in an existing coding rule, a coding sequence of synchronization information in the outer loop time segment is different from a coding sequence of the same kind of synchronization information in the inner loop time segment in the second wireless network device in this solution. Herein, this is referred to as an adjusted coding rule. The second wireless network device codes the synchronization information by using the adjusted coding rule. After receiving the synchronization information sent by the second wireless network device, the first wireless network device may obtain the coding sequence in the synchronization information. If the coding sequence in the synchronization information is a coding sequence in the synchronization information in the outer loop time segment, the first wireless network device may determine that the synchronization information is in the outer loop time segment, and further send feedback information corresponding to the synchronization information to the second wireless network device.

Optionally, the primary synchronization sequence in the coding sequence is determined based on a cell corresponding to the synchronization information and based on whether the synchronization information is in the outer loop time segment or the inner loop time segment. The first wireless network device determines, according to the primary synchronization sequence in the coding sequence in the synchronization information, whether the synchronization information is in the outer loop time segment or the inner loop time segment.

During implementation, the primary synchronization sequence in the coding sequence may be designed based on the cell corresponding to the synchronization information and based on whether the synchronization information is in the outer loop time segment or the inner loop time segment. Primary synchronization sequences in synchronization information in different time segments have different root indexes. Specifically, it may be designed that the primary synchronization sequences in the synchronization information in the inner and outer loop time segments have different root indexes. The outer loop time segment are corresponding to 0, 1, and 2, and the inner loop time segment are corresponding to 3, 4, and 5, as shown in Table 3:

TABLE 3

Root indexes of primary synchronization information

| $N_{ID}^{(2)}$ | Root index u |
|---|---|
| 0 | 25 |
| 1 | 29 |
| 2 | 34 |
| 3 | 14 |
| 4 | 26 |
| 5 | 32 |

In addition, the secondary synchronization information in a related technology is modified as follows:

$c_0(n) = \tilde{c}((n + N_{ID}^{(2)}) \bmod 31)$
$c_1(n) = \tilde{c}((n + N_{ID}^{(2)} + 3) \bmod 31)$ $\implies$ $c_0(n) = \tilde{c}((n + N_{ID}^{(2)}) \bmod 31)$
$c_1(n) = \tilde{c}((n + N_{ID}^{(2)} + 6) \bmod 31)$ Further, after receiving synchronization information that uses the foregoing design, the first wireless network device may obtain a corresponding root index according to the primary synchronization sequence, and then determine, according to the root index, whether the synchronization information is in the outer loop time segment or the inner loop time segment.

Optionally, the secondary synchronization sequence in the coding sequence is determined based on the cell corresponding to the synchronization information and based on whether the synchronization information is in the outer loop time segment or the inner loop time segment. The first wireless network device determines, according to the secondary synchronization sequence in the coding sequence in the synchronization information, whether the synchronization information is in the outer loop time segment or the inner loop time segment.

During implementation, the secondary synchronization sequence in the coding sequence may be designed based on the cell corresponding to the synchronization information and based on whether the synchronization information is in the outer loop time segment or the inner loop time segment. Different specific coding rules are used for synchronization information in different time segments. Specifically, in a high frequency communications system or a massive multiple-input multiple-output (massive Multiple-Input Multiple-Output, massive MIMO), a subframe becomes shorter, and same synchronization information does not need to be sent twice in a radio frame. Therefore, a synchronization channel design of a subframe 0 and a subframe 5 in the related technology may be applied to a synchronization information design of the outer loop time segment and the inner loop time segment. A generated sequence is as follows:

$$d(2n) = \begin{cases} s_0^{(m_0)}(n)c_0(n) & \text{Outer loop time segment} \\ s_1^{(m_1)}(n)c_0(n) & \text{Inner loop time segment} \end{cases}$$

$$d(2n+1) = \begin{cases} s_1^{(m_1)}(n)c_1(n)z_1^{(m_0)}(n) & \text{Outer loop time segment} \\ s_0^{(m_0)}(n)c_1(n)z_1^{(m_1)}(n) & \text{Inner loop time segment} \end{cases}$$

Generation of each sequence is the same as that in the related technology.

Further, after receiving the synchronization information that uses the foregoing design, the first wireless network device may determine, according to the secondary synchronization sequence, whether the synchronization information is in the outer loop time segment or the inner loop time segment.

Based on the same concept, the embodiment of this application further provides a synchronization information identification system. The system provided in this embodiment can implement the procedure of the embodiment of this application shown in FIG. 7. For specific processing, refer to related content of step 701 to step 705. Correspondingly, the system may include the first wireless network device and the second wireless network device that implement the procedure of the embodiment shown in FIG. 7. Details are not described herein again.

Figure 8:
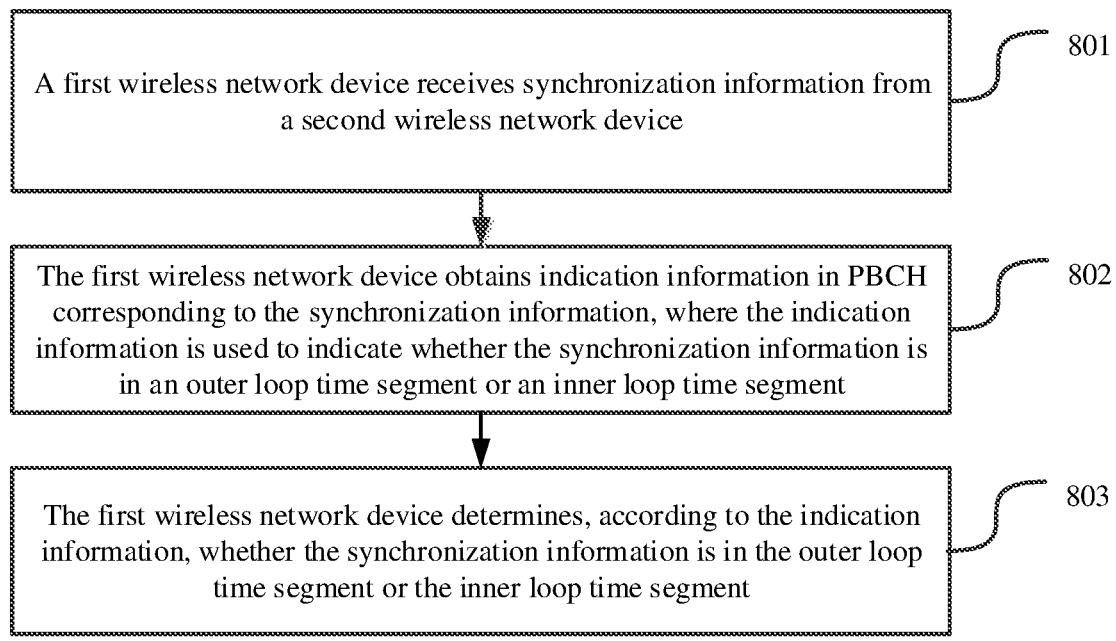
FIG. 8 is a flowchart of a synchronization information identification method according to the embodiment of this application.

The embodiment further provides a synchronization information identification method. A specific procedure is shown in FIG. 8, and implementation content may be as follows.

Step 801: A first wireless network device receives synchronization information from a second wireless network device.

Step 802: The first wireless network device obtains indication information in PBCH broadcast information corresponding to the synchronization information, where the indication information is used to indicate whether the synchronization information is in an outer loop time segment or an inner loop time segment.

Step 803: The first wireless network device determines, according to the indication information, whether the synchronization information is in the outer loop time segment or the inner loop time segment.

Optionally, step 804 may be further included: If the synchronization information is in the outer loop time segment, the first wireless network device sends feedback information corresponding to the synchronization information to the second wireless network device.

During implementation, after receiving the synchronization information sent by the second wireless network device, the first wireless network device may obtain the indication information in the corresponding PBCH broadcast information, determine, according to the indication information, a time segment of the synchronization information, and if the synchronization information is in the outer loop time segment, send the feedback information corresponding to the synchronization information to the second wireless network device.

Optionally, a value of the indication information may be 0 or 1. The value 0 or 1 of the indication information indicates whether the synchronization information is in the outer loop time segment or the inner loop time segment, respectively.

During implementation, the second wireless network device may add a synchronization information identifier (sch-index) to a master information block, to indicate whether the synchronization information is in the outer loop time segment or the inner loop time segment. A bit value 0 represents that the synchronization information is in the outer loop time segment, a bit value 1 represents that the synchronization information is in the inner loop time segment, or vice versa, that is, a bit value 0 represents that the synchronization information is in the inner loop time segment, a bit value 1 represents that the synchronization information is in the outer loop time segment.

Optionally, after receiving the synchronization information sent by the second wireless network device, the first wireless network device may perform time-domain symbol synchronization according to the synchronization information. Corresponding processing may be as follows: The first wireless network device determines a symbol location of the synchronization information, and performs the time-domain symbol synchronization according to the symbol location of the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment; and if the synchronization information is in the outer loop time segment, the first wireless network device sends the feedback information corresponding to the synchronization information to the second wireless network device. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Based on the same concept, the embodiment of this application further provides a synchronization information identification system. The system provided in this embodiment can implement the procedure of the embodiment of this application shown in FIG. 8. For specific processing, refer to related content of step 801 to step 803. Correspondingly, the system may include the first wireless network device and the second wireless network device that implement the procedure of the embodiment shown in FIG. 8. Details are not described herein again.

The embodiment further provides a time-domain symbol synchronization method, and the method may include: after receiving synchronization information from a second wireless network device, a first wireless network device performs time-domain symbol synchronization according to the synchronization information, and corresponding processing may be as follows: the first wireless network device determines a symbol location of the synchronization information, and performs time-domain symbol synchronization according to the symbol location of the synchronization information.

During implementation, when a subframe carries multiple pieces of synchronization information, after receiving the synchronization information, the first wireless network device may obtain the symbol location of the synchronization information, that is, determine a specific time corresponding to the synchronization information, and further the first wireless network device may determine a start time of a next synchronization period, and receive subsequent information at a start time of a corresponding subframe.

Optionally, the first wireless network device may determine the symbol location of the synchronization information in multiple manners, and two feasible manners are provided as follows.

Manner 1: The first wireless network device obtains a beam identifier or a synchronization information index in the synchronization information, and the first wireless network device determines the symbol location of the synchronization information according to a preset correspondence between a beam identifier or a synchronization information index and a symbol location.

During implementation, the first wireless network device may pre-obtain the correspondence between a beam identifier or a synchronization information index and a symbol location, where the correspondence is set by the second wireless network device, and after obtaining the beam identifier or the synchronization information index in the synchronization information, determine the symbol location of the synchronization information according to the correspondence. For example, there are a total of eight pieces of synchronization information, synchronization information 0 is at symbol locations 1 and 2, synchronization information 1 is at symbol locations 3 and 4, synchronization information 2 is at symbol locations 5 and 6, synchronization information 3 is at symbol locations 7 and 8, synchronization information 4 is at the symbol locations 1 and 2, and so on. When a synchronization information index 2 is obtained, symbol locations of the synchronization information 2 are 5 and 6.

Manner 2: The first wireless network device obtains the symbol location of the synchronization information from PBCH broadcast information corresponding to the synchronization information.

During implementation, after receiving a piece of synchronization information, the first wireless network device may obtain the symbol location of the synchronization information from the PBCH broadcast information corresponding to the synchronization information. The PBCH broadcast information corresponding to the synchronization information and the synchronization information are within a time-domain and/or frequency-domain range corresponding to a same beam. For example, there are a total of two pieces of synchronization information in a subframe, and one bit of indication information in the PBCH broadcast information may be used to specifically indicate the symbol location corresponding to the synchronization information. If there are four pieces of synchronization information in a subframe, and two bits of indication information in the PBCH broadcast information may be used to indicate the symbol location corresponding to the synchronization information. For example, a symbol index may be added to a master information block, to indicate the symbol location.

The time-domain symbol synchronization method may be executed after synchronization information is identified by the first wireless network device. For the specific synchronization information identification method executed by the first wireless network device, refer to the descriptions in the embodiment described above. Details are not repeated herein.

The embodiment further provides a wireless network device for time-domain symbol synchronization. The wireless network device may include a plurality of functional modules, to implement the foregoing method. The wireless network device may be the first wireless network device or the second wireless network device described above. Details are not repeated herein. The embodiment further provides a time-domain symbol synchronization system, including the first wireless network device and the second wireless network device that implement the foregoing method.

Figure 9:
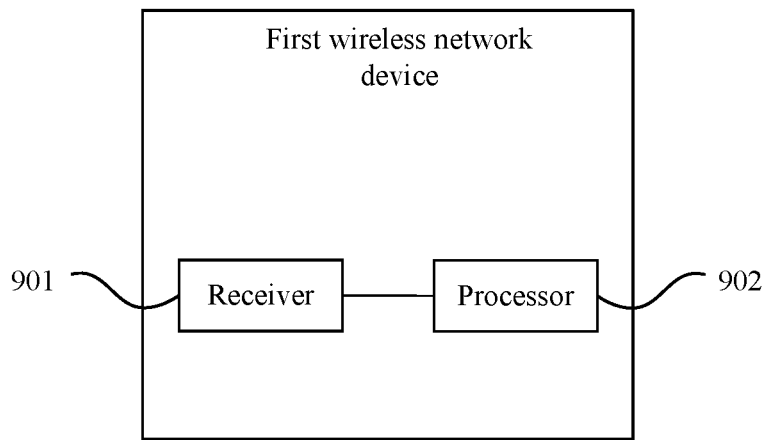
FIG. 9 is a schematic structural diagram of a synchronization information identification apparatus according to the embodiment of this application.

Based on the same concept, the embodiment of this application further provides a first wireless network device. As shown in FIG. 9, the first wireless network device provided in this embodiment can implement the procedure of the embodiment of this application shown in FIG. 1. The first wireless network device includes a receiver 901 and a processor 902.

The receiver 901 is configured to receive synchronization information from a second wireless network device.

The processor 902 is configured to obtain time-domain location information of the synchronization information from synchronization configuration information corresponding to the synchronization information.

The processor 902 is configured to determine, according to a relative time-domain location of an outer loop time segment in a synchronization period and/or a relative time-domain location of an inner loop time segment in the synchronization period, and the time-domain location information of the synchronization information, whether the synchronization information is in the outer loop time segment or the inner loop time segment.

Optionally, the first wireless network device may further include a transmitter 903. The processor 902 may be further configured to: when the synchronization information is in the outer loop time segment, send, by using the transmitter 903, feedback information corresponding to the synchronization information to the second wireless network device.

Optionally, the time-domain location information of the synchronization information is a frame number of a radio frame for the synchronization information.

Optionally, the outer loop time segment includes a dedicated discovery subframe, and the dedicated discovery subframe is specifically to send synchronization information of different cells and/or beams.

Optionally, the processor 902 is configured to: obtain the time-domain location information of the synchronization information from RRC signaling corresponding to the synchronization information; or obtain the time-domain location information of the synchronization information from PBCH broadcast information corresponding to the synchronization information.

Optionally, the processor 902 is further configured to: determine the relative time-domain location of the outer loop time segment in the synchronization period and/or the relative time-domain location of the inner loop time segment in the synchronization period according to a length of the synchronization period and a total beam quantity.

Optionally, the processor 902 is configured to: determine the relative time-domain location of the outer loop time segment in the synchronization period and/or the relative time-domain location of the inner loop time segment in the synchronization period according to a preset synchronization period length and a preset total beam quantity; or determine the relative time-domain location of the outer loop time segment in the synchronization period and/or the relative time-domain location of the inner loop time segment in the synchronization period according to indication information that is of the length of the synchronization period and the total beam quantity and that is carried in the RRC signaling; or determine the relative time-domain location of the outer loop time segment in the synchronization period and/or the relative time-domain location of the inner loop time segment in the synchronization period according to indication information that is of the length of the synchronization period and the total beam quantity and that is carried in the PBCH broadcast information.

Optionally, the processor 902 is configured to: determine, according to the relative time-domain location of the outer loop time segment in the synchronization period and/or the relative time-domain location of the inner loop time segment in the synchronization period, and the time-domain location information of the synchronization information, whether a radio frame for the synchronization information is an outer loop radio frame or an inner loop radio frame; and if the radio frame for the synchronization information is the outer loop radio frame, determine that the synchronization information is in the outer loop time segment; or if the radio frame for the synchronization information is the inner loop radio frame, determine that the synchronization information is in the inner loop time segment.

Optionally, the processor 902 is further configured to: if it is determined, according to a relative time-domain location of the outer loop radio frame in the synchronization period and/or a relative time-domain location of the inner loop radio frame in the synchronization period, and the time-domain location information of the synchronization information, that the radio frame for the synchronization information is a hybrid radio frame, obtain a beam identifier in the synchronization information, where the hybrid radio frame is a radio frame including a part of the outer loop time segment and a part of the inner loop time segment; and determine, according to a preset beam identifier corresponding to the outer loop time segment in the hybrid radio frame, a preset beam identifier corresponding to the inner loop time segment in the hybrid radio frame, and the beam identifier in the synchronization information, whether the synchronization information is in the outer loop time segment or the inner loop time segment.

Optionally, the processor 902 is further configured to: if it is determined, according to the relative time-domain location of the outer loop radio frame in the synchronization period and/or the relative time-domain location of the inner loop radio frame in the synchronization period, and the time-domain location information of the synchronization information, that the radio frame for the synchronization information is a hybrid radio frame, obtain a subframe number of a subframe for the synchronization information; and determine, according to a preset subframe number corresponding to the outer loop time segment in the hybrid radio frame, a preset subframe number corresponding to the inner loop time segment in the hybrid radio frame, and the subframe number of the subframe for the synchronization information, whether the synchronization information is in the outer loop time segment or the inner loop time segment.

Optionally, the processor 902 is configured to: obtain, from the PBCH broadcast information corresponding to the synchronization information, the subframe number of the subframe for the synchronization information; or determine, according to a preset beam identifier corresponding to the outer loop time segment in the hybrid radio frame, a preset beam identifier corresponding to the inner loop time segment in the hybrid radio frame, and the beam identifier in the synchronization information, the subframe number of the subframe for the synchronization information.

Optionally, the processor 902 is further configured to: determine a symbol location of the synchronization information, and perform time-domain symbol synchronization according to the symbol location of the synchronization information.

Optionally, the processor 902 is configured to: obtain the beam identifier or a synchronization information index in the synchronization information; and determine the symbol location of the synchronization information according to a preset correspondence between a beam identifier or a synchronization information index and a symbol location.

Optionally, the processor 902 is configured to: obtain the symbol location of the synchronization information from the PBCH broadcast information corresponding to the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; and the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Figure 10:
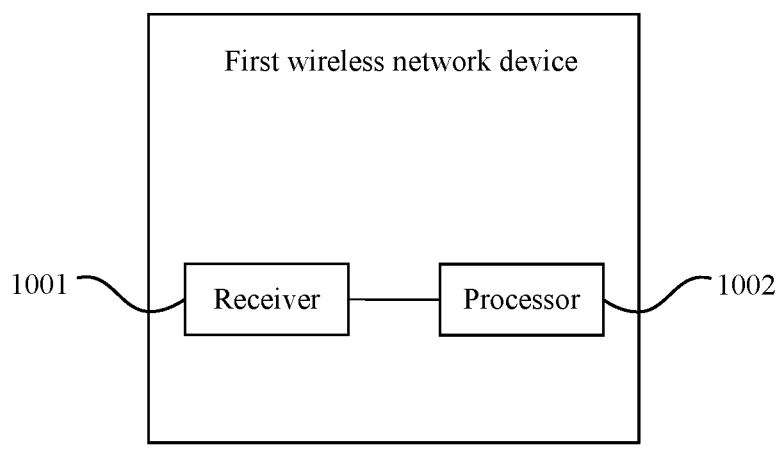
FIG. 10 is a schematic structural diagram of a synchronization information identification apparatus according to the embodiment of this application.

Based on the same concept, the embodiment of this application further provides a first wireless network device. As shown in FIG. 10, the first wireless network device provided in this embodiment can implement the procedure of the embodiment of this application shown in FIG. 7. The first wireless network device includes a receiver 1001 and a processor 1002.

The receiver 1001 is configured to receive synchronization information from a second wireless network device.

The processor 1002 is configured to obtain a coding sequence in the synchronization information. The coding sequence is determined based on a cell and/or beam corresponding to the synchronization information and based on whether the synchronization information is in an outer loop time segment or an inner loop time segment.

The processor 1002 is configured to determine, according to the coding sequence in the synchronization information, whether the synchronization information is in the outer loop time segment or the inner loop time segment.

Optionally, the first wireless network device further includes a transmitter 1003. The processor 1002 may be further configured to: when the synchronization information is in the outer loop time segment, send, by using the transmitter 1003, feedback information corresponding to the synchronization information to the second wireless network device.

Optionally, a primary synchronization sequence in the coding sequence is determined based on a cell corresponding to the synchronization information and based on whether the synchronization information is in the outer loop time segment or the inner loop time segment.

The processor 1002 is configured to: determine, according to the primary synchronization sequence in the coding sequence in the synchronization information, whether the synchronization information is in the outer loop time segment or the inner loop time segment.

Optionally, a secondary synchronization sequence in the coding sequence is determined based on the cell corresponding to the synchronization information and based on whether the synchronization information is in the outer loop time segment or the inner loop time segment.

The processor 1002 is configured to: determine, according to the secondary synchronization sequence in the coding sequence in the synchronization information, whether the synchronization information is in the outer loop time segment or the inner loop time segment.

Optionally, the processor 1002 is further configured to: determine a symbol location of the synchronization information, and perform time-domain symbol synchronization according to the symbol location of the synchronization information.

Optionally, the processor 1002 is configured to: obtain a beam identifier in the synchronization information; and determine the symbol location of the synchronization information according to a preset correspondence between a beam identifier and a symbol location.

Optionally, the processor 1002 is configured to: obtain the symbol location of the synchronization information from PBCH broadcast information corresponding to the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; and the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Figure 11:
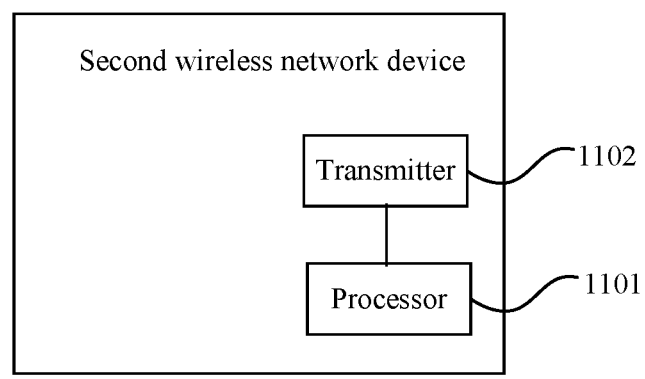
FIG. 11 is a schematic structural diagram of a synchronization information identification apparatus according to the embodiment of this application.

Based on the same concept, the embodiment of this application further provides a second wireless network device. As shown in FIG. 11, the second wireless network device provided in this embodiment can implement the procedure of the embodiment of this application shown in FIG. 7. The second wireless network device includes a processor 1101 and a transmitter 1102.

The processor 1101 is configured to generate a coding sequence in synchronization information based on a cell and/or beam corresponding to the to-be-sent synchronization information and based on whether the synchronization information is in an outer loop time segment or an inner loop time segment.

The transmitter 1102 is configured to send the synchronization information including the coding sequence to a first wireless network device. The synchronization information including the coding sequence is used to determine, according to the coding sequence, whether the synchronization information is in the outer loop time segment or the inner loop time segment. Optionally, the processor 1101 is further configured to feed back feedback information corresponding to the synchronization information by using the transmitter 1102 when the synchronization information is in the outer loop time segment.

According to this embodiment disclosed, the first wireless network device receives the synchronization information sent by the second wireless network device, and obtains time-domain location information of the synchronization information; the first wireless network device determines the relative time-domain location of the synchronization information in the current synchronization period according to the time-domain location information of the synchronization information; and the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Figure 12:
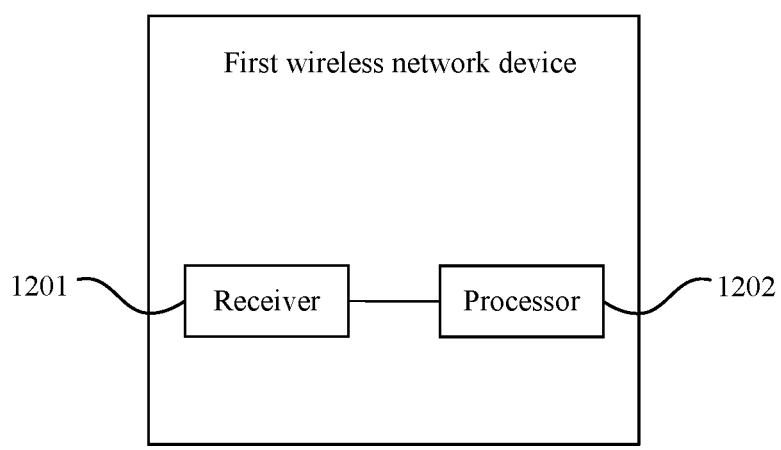
FIG. 12 is a schematic structural diagram of a synchronization information identification apparatus according to the embodiment of this application.

Based on the same concept, the embodiment of this application further provides a wireless network device. As shown in FIG. 12, the wireless network device provided in this embodiment can implement the procedure of the first wireless network device side in the embodiment of this application shown in FIG. 8. The wireless network device includes a receiver 1201 and a processor 1202.

The receiver 1201 is configured to receive synchronization information from a second wireless network device.

The processor 1202 is configured to obtain indication information in PBCH broadcast information corresponding to the synchronization information. The indication information is used to indicate whether the synchronization information is in an outer loop time segment or an inner loop time segment.

The processor 1202 is configured to determine, according to the indication information, whether the synchronization information is in the outer loop time segment or the inner loop time segment.

The wireless network device further includes a transmitter 1203. The processor 1202 may be further configured to: when the synchronization information is in the outer loop time segment, send, by using the transmitter 1203, feedback information corresponding to the synchronization information to the second wireless network device.

Optionally, a value of the indication information is 0 or 1. The value 0 or 1 of the indication information indicates whether the synchronization information is in the outer loop time segment or the inner loop time segment, respectively.

Optionally, the processor 1202 is further configured to: determine a symbol location of the synchronization information, and perform time-domain symbol synchronization according to the symbol location of the synchronization information.

Optionally, the processor 1202 is configured to: obtain a beam identifier in the synchronization information; and determine the symbol location of the synchronization information according to a preset correspondence between a beam identifier and a symbol location.

Optionally, the processor 1202 is configured to: obtain the symbol location of the synchronization information from the PBCH broadcast information corresponding to the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; and the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Correspondingly, the embodiment further provides a wireless network device. The wireless network device provided in this embodiment can implement the procedure of the second wireless network device side in the embodiment of this application shown in FIG. 8. The wireless network device includes a transmitter and a processor. The processor is configured to: generate synchronization information, add, to broadcast information corresponding to the synchronization information, information indicating whether the synchronization information is in an outer loop time segment or an inner loop time segment, and send the synchronization information and the broadcast information by using the transmitter. The wireless network device may further include a receiver. The receiver, and the transmitter, and the processor cooperatively implement a function of the second wireless network device side. For details, refer to description of the foregoing method procedure and the second wireless network device side. Details are not repeated herein.

Figure 13:
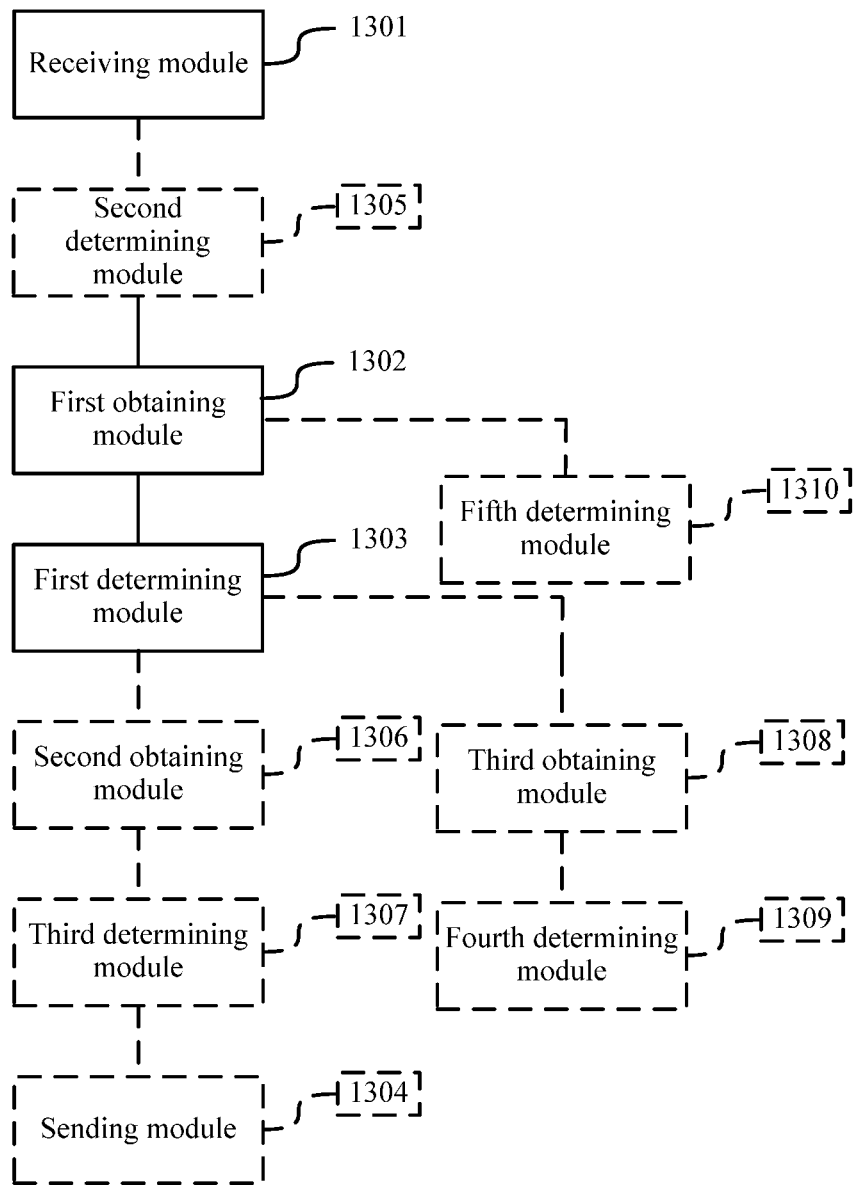
FIG. 13 is a schematic structural diagram of a synchronization information identification apparatus according to the embodiment of this application.

Based on the same concept, the embodiment of this application further provides a synchronization information identification apparatus. As shown in FIG. 13, the wireless network device provided in this embodiment can implement the procedure of the embodiment of this application shown in FIG. 1. The synchronization information identification apparatus includes a receiving module 1301, a first obtaining module 1302, and a first determining module 1303.

The receiving module 1301 is configured to receive synchronization information from a second wireless network device, where the specific function may be implemented by a receiver.

The first obtaining module 1302 is configured to obtain time-domain location information of the synchronization information from synchronization configuration information corresponding to the synchronization information, where the specific function may be implemented by a processor.

The first determining module 1303 is configured to determine, according to a relative time-domain location of an outer loop time segment in a synchronization period and/or a relative time-domain location of an inner loop time segment in the synchronization period, and the time-domain location information of the synchronization information, whether the synchronization information is in the outer loop time segment or the inner loop time segment, where the specific function may be implemented by the processor.

Optionally, the synchronization information identification apparatus may further include a sending module 1304. The sending module 1304 is configured to send feedback information corresponding to the synchronization information to the second wireless network device if the synchronization information is in the outer loop time segment, where the specific function may be implemented by a transmitter.

Optionally, the time-domain location information of the synchronization information is a frame number of a radio frame for the synchronization information.

Optionally, the outer loop time segment includes a dedicated discovery subframe, and the dedicated discovery subframe is specifically to send synchronization information of different cells and/or beams.

Optionally, the first obtaining module 1302 is configured to: obtain the time-domain location information of the synchronization information from RRC signaling corresponding to the synchronization information; or obtain the time-domain location information of the synchronization information from PBCH broadcast information corresponding to the synchronization information.

Optionally, the apparatus further includes: a second determining module 1305, configured to determine the relative time-domain location of the outer loop time segment in the synchronization period and/or the relative time-domain location of the inner loop time segment in the synchronization period according to a length of the synchronization period and a total beam quantity, where the specific function may be implemented by the processor.

Optionally, the second determining module 1305 is configured to: determine the relative time-domain location of the outer loop time segment in the synchronization period and/or the relative time-domain location of the inner loop time segment in the synchronization period according to a preset synchronization period length and a preset total beam quantity; or determine the relative time-domain location of the outer loop time segment in the synchronization period and/or the relative time-domain location of the inner loop time segment in the synchronization period according to indication information that is of the length of the synchronization period and the total beam quantity and that is carried in the RRC signaling; or determine the relative time-domain location of the outer loop time segment in the synchronization period and/or the relative time-domain location of the inner loop time segment in the synchronization period according to indication information that is of the length of the synchronization period and the total beam quantity and that is carried in the PBCH broadcast information.

Optionally, the first determining module 1303 is configured to: determine, according to a relative time-domain location of an outer loop radio frame in the synchronization period and/or a relative time-domain location of an inner loop radio frame in the synchronization period, and the time-domain location information of the synchronization information, whether a radio frame for the synchronization information is an outer loop radio frame or an inner loop radio frame; and if the radio frame for the synchronization information is the outer loop radio frame, determine that the synchronization information is in the outer loop time segment; or if the radio frame for the synchronization information is the inner loop radio frame, determine that the synchronization information is in the inner loop time segment.

Optionally, the apparatus further includes: a second obtaining module 1306, configured to obtain a beam identifier in the synchronization information if it is determined, according to the relative time-domain location of the outer loop radio frame in the synchronization period and/or the relative time-domain location of the inner loop radio frame in the synchronization period, and the time-domain location information of the synchronization information, that a radio frame for the synchronization information is a hybrid radio frame, where the hybrid radio frame is a radio frame including a part of the outer loop time segment and a part of the inner loop time segment, and the specific function may be implemented by the processor; and a third determining module 1307, configured to determine, according to a preset beam identifier corresponding to the outer loop time segment in the hybrid radio frame, a preset beam identifier corresponding to the inner loop time segment in the hybrid radio frame, and the beam identifier in the synchronization information, whether the synchronization information is in the outer loop time segment or the inner loop time segment, where the specific function may be implemented by the processor.

Optionally, the apparatus further includes: a third obtaining module 1308, configured to obtain a subframe number of a subframe for the synchronization information if it is determined, according to the relative time-domain location of the outer loop radio frame in the synchronization period and/or the relative time-domain location of the inner loop radio frame in the synchronization period, and the time-domain location information of the synchronization information, that a radio frame for the synchronization information is a hybrid radio frame, where the specific function may be implemented by the processor; and a fourth determining module 1309, configured to determine, according to a preset subframe number corresponding to the outer loop time segment in the hybrid radio frame, a preset subframe number corresponding to the inner loop time segment in the hybrid radio frame, and the subframe number of the subframe for the synchronization information, whether the synchronization information is in the outer loop time segment or the inner loop time segment, where the specific function may be implemented by the processor.

Optionally, the third obtaining module 1308 is configured to: obtain, from the PBCH broadcast information corresponding to the synchronization information, the subframe number of the subframe for the synchronization information; or determine, according to a preset beam identifier corresponding to the outer loop time segment in the hybrid radio frame, a preset beam identifier corresponding to the inner loop time segment in the hybrid radio frame, and the beam identifier in the synchronization information, the subframe number of the subframe for the synchronization information.

Optionally, the apparatus further includes: a fifth determining module 1310, configured to determine a symbol location of the synchronization information, and perform time-domain symbol synchronization according to the symbol location of the synchronization information, where the specific function may be implemented by the processor.

Optionally, the fifth determining module 1310 is configured to: obtain a beam identifier in the synchronization information; and determine the symbol location of the synchronization information according to a preset correspondence between a beam identifier and a symbol location.

Optionally, the fifth determining module 1310 is configured to: obtain the symbol location of the synchronization information from the PBCH broadcast information corresponding to the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment; and if the synchronization information is in the outer loop time segment, the first wireless network device sends the feedback information corresponding to the synchronization information to the second wireless network device. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Figure 14:
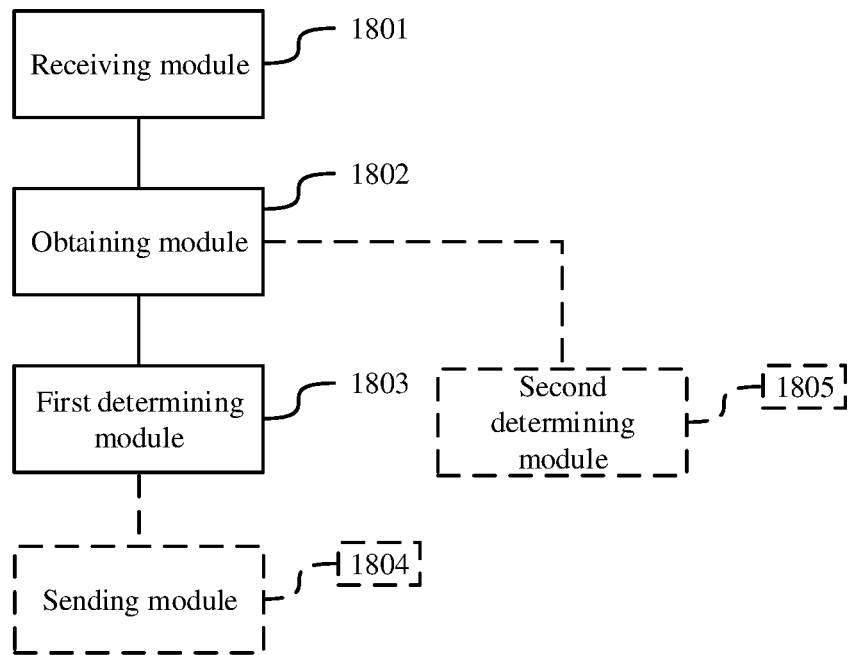
FIG. 14 is a schematic structural diagram of a synchronization information identification apparatus according to the embodiment of this application.

Based on the same concept, the embodiment of this application further provides a synchronization information identification apparatus. As shown in FIG. 14, the wireless network device provided in this embodiment can implement the procedure of the embodiment of this application shown in FIG. 7. The synchronization information identification apparatus includes a receiving module 1801, an obtaining module 1802, and a first determining module 1803.

The receiving module 1801 is configured to receive synchronization information from a second wireless network device, where the specific function may be implemented by a receiver.

The obtaining module 1802 is configured to obtain a coding sequence in the synchronization information, where the specific function may be implemented by a processor. The coding sequence is determined based on a cell and/or beam corresponding to the synchronization information and based on whether the synchronization information is in an outer loop time segment or an inner loop time segment.

The first determining module 1803 is configured to determine, according to the coding sequence in the synchronization information, whether the synchronization information is in the outer loop time segment or the inner loop time segment, where the specific function may be implemented by the processor.

Optionally, the synchronization information identification apparatus further includes a sending module 1804. The sending module 1804 is configured to send feedback information corresponding to the synchronization information to the second wireless network device if the synchronization information is in the outer loop time segment, where the specific function may be implemented by a transmitter.

Optionally, a primary synchronization sequence in the coding sequence is determined based on a cell corresponding to the synchronization information and based on whether the synchronization information is in the outer loop time segment or the inner loop time segment.

The first determining module 1803 is configured to: determine, according to the primary synchronization sequence in the coding sequence in the synchronization information, whether the synchronization information is in the outer loop time segment or the inner loop time segment.

Optionally, a secondary synchronization sequence in the coding sequence is determined based on the cell corresponding to the synchronization information and based on whether the synchronization information is in the outer loop time segment or the inner loop time segment.

The first determining module 1803 is configured to: determine, according to the secondary synchronization sequence in the coding sequence in the synchronization information, whether the synchronization information is in the outer loop time segment or the inner loop time segment.

Optionally, the apparatus further includes: a second determining module 1805, configured to determine a symbol location of the synchronization information, and perform time-domain symbol synchronization according to the symbol location of the synchronization information, where the specific function may be implemented by the processor.

Optionally, the second determining module 1805 is configured to: obtain a beam identifier in the synchronization information; and determine the symbol location of the synchronization information according to a preset correspondence between a beam identifier and a symbol location.

Optionally, the second determining module 1805 is configured to: obtain the symbol location of the synchronization information from PBCH broadcast information corresponding to the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment; and if the synchronization information is in the outer loop time segment, the first wireless network device sends the feedback information corresponding to the synchronization information to the second wireless network device. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Figure 15:
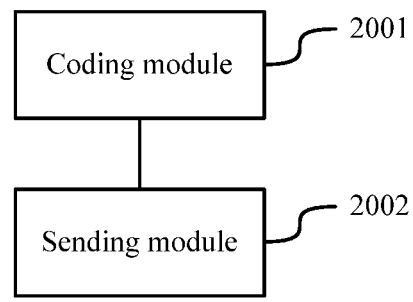
FIG. 15 is a schematic structural diagram of a synchronization information identification apparatus according to the embodiment of this application.

Based on the same concept, the embodiment of this application further provides a synchronization information identification apparatus. As shown in FIG. 15, the wireless network device provided in this embodiment can implement the procedure of the embodiment of this application shown in FIG. 7. The synchronization information identification apparatus includes a coding module 2001 and a sending module 2002.

The coding module 2001 is configured to generate a coding sequence in synchronization information based on a cell and/or beam corresponding to the to-be-sent synchronization information and based on whether the synchronization information is in an outer loop time segment or an inner loop time segment, where the specific function may be implemented by a processor.

The sending module 2002 is configured to send the synchronization information including the coding sequence to a first wireless network device, where the specific function may be implemented by a transmitter. The synchronization information including the coding sequence is used to determine, according to the coding sequence, whether the synchronization information is in the outer loop time segment or the inner loop time segment. Optionally, the sending module 2002 is further configured to feed back feedback information corresponding to the synchronization information if the synchronization information is in the outer loop time segment.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment; and if the synchronization information is in the outer loop time segment, the first wireless network device sends the feedback information corresponding to the synchronization information to the second wireless network device. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

Figure 16:
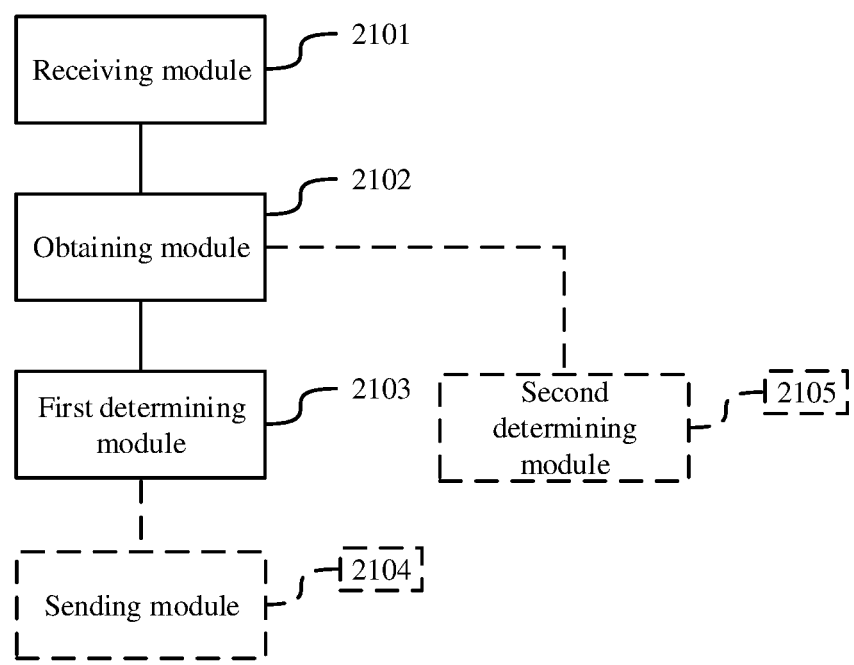
FIG. 16 is a schematic structural diagram of a synchronization information identification apparatus according to the embodiment of this application.

Based on the same concept, the embodiment of this application further provides a synchronization information identification apparatus. As shown in FIG. 16, the wireless network device provided in this embodiment can implement the procedure of the first wireless network device side in the embodiment of this application shown in FIG. 8. The synchronization information identification apparatus includes a receiving module 2101, an obtaining module 2102, and a first determining module 2103.

The receiving module 2101 is configured to receive synchronization information from a second wireless network device, where the specific function may be implemented by a receiver.

The obtaining module 2102 is configured to obtain indication information in PBCH broadcast information corresponding to the synchronization information, where the specific function may be implemented by a processor. The indication information is used to indicate whether the synchronization information is in an outer loop time segment or an inner loop time segment.

The first determining module 2103 is configured to determine, according to the indication information, whether the synchronization information is in the outer loop time segment or the inner loop time segment, where the specific function may be implemented by the processor.

Optionally, the synchronization information identification apparatus further includes a sending module 2104. The sending module 2104 is configured to send feedback information corresponding to the synchronization information to the second wireless network device if the synchronization information is in the outer loop time segment, where the specific function may be implemented by a transmitter.

Optionally, a value of the indication information is 0 or 1. The value 0 or 1 of the indication information indicates whether the synchronization information is in the outer loop time segment or the inner loop time segment, respectively.

Optionally, the apparatus further includes: a second determining module 2105, configured to determine a symbol location of the synchronization information, and perform time-domain symbol synchronization according to the symbol location of the synchronization information, where the specific function may be implemented by the processor.

Optionally, the second determining module 2105 is configured to: obtain a beam identifier in the synchronization information; and determine the symbol location of the synchronization information according to a preset correspondence between a beam identifier and a symbol location.

Optionally, the second determining module 2105 is configured for the first wireless network device to: obtain the symbol location of the synchronization information from the PBCH broadcast information corresponding to the synchronization information.

According to this embodiment disclosed, the first wireless network device receives the synchronization information sent by the second wireless network device, and obtains the time-domain location information of the synchronization information; the first wireless network device determines the relative time-domain location of the synchronization information in the current synchronization period according to the time-domain location information of the synchronization information; the first wireless network device determines, according to a preset relative time-domain location of the outer loop time segment in the synchronization period and/or a preset relative time-domain location of the inner loop time segment in the synchronization period, and the relative time-domain location of the synchronization information in the current synchronization period, whether the synchronization information is in the outer loop time segment or the inner loop time segment; and if the synchronization information is in the outer loop time segment, the first wireless network device sends the feedback information corresponding to the synchronization information to the second wireless network device. In this way, the wireless network device may determine, according to the time-domain location information of the received synchronization information, whether the synchronization information is in the outer loop time segment or the inner loop time segment, and further send only feedback information corresponding to synchronization information in the outer loop time segment. This can save communications resources of the wireless network device.

It should be noted that, when the synchronization information identification apparatus provided in the foregoing embodiment identifies synchronization information, only division of the foregoing functional modules is used as an example for description. In an actual application, the foregoing functions may be allocated to different functional modules for implementation according to a requirement. That is, an internal structure of the synchronization information identification apparatus is divided into different functional modules to implement all or some of the functions described above. In addition, the embodiments of the synchronization information identification apparatus and the synchronization information identification method provided in the foregoing embodiments belong to a same concept. For a specific implementation process thereof, refer to the method embodiment. Details are not repeated herein.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely the embodiment of this application, but are not intended to limit this application. Any modification, equivalent replacement, or improvement made without departing from the principle of this application shall fall within the protection scope of this application.

What is claimed is:

1. A method, comprising:
   receiving, by a terminal from a device, synchronization information;
   obtaining, by the terminal, an index of the synchronization information;
   obtaining, by the terminal, time-domain location information of the synchronization information, wherein the time-domain location information is obtained from synchronization configuration information corresponding to the synchronization information;
   determining, by the terminal, a time segment of a synchronization period used by the device to send the synchronization information, wherein the time segment is an outer loop time segment in a synchronization period or an inner loop time segment in the synchronization period, and the time segment is determined by the terminal according to the time-domain location information of the synchronization information, and according to a relative time-domain location of the outer loop time segment in the synchronization period or a relative time-domain location of the inner loop time segment in the synchronization period;

after obtaining the index and receiving the synchronization information, determining, by the terminal, a symbol location of a symbol that carried the received synchronization information, wherein the symbol location is determined by the terminal using the obtained index and a correspondence between the obtained index and the symbol location; and performing, by the terminal, time-domain symbol synchronization with the device according to the determined symbol location.

2. The method according to claim 1, wherein the symbol location comprises more than one symbol.

3. The method according to claim 1, wherein the correspondence between the obtained index and the symbol location is preset.

4. The method according to claim 1, further comprising: determining, by the terminal, the relative time-domain location of the outer loop time segment in the synchronization period or the relative time-domain location of the inner loop time segment in the synchronization period according to a length of the synchronization period and a total beam quantity.

5. The method according to claim 1, wherein determining, by the terminal, the time segment of the synchronization period used by the device to send the synchronization information comprises:

determining, by the terminal, that a radio frame used by the device to send the synchronization information is a hybrid radio frame, wherein the hybrid radio frame comprises a part of the outer loop time segment and a part of the inner loop time segment, and wherein the radio frame used by the device to send the synchronization information is determined to be the hybrid radio frame according to the time-domain location information of the synchronization information, the relative time-domain location of the outer loop time segment in the synchronization period, and the relative time-domain location of the inner loop time segment in the synchronization period; and determining, by the terminal, the time segment of the synchronization period used by the device to send the synchronization information, wherein the time segment of the synchronization period used by the device to send the synchronization information is determined according to a second index corresponding to part of the outer loop time segment in the hybrid radio frame, a third index corresponding to the part of the inner loop time segment in the hybrid radio frame, and the obtained index.

6. The method according to claim 1, wherein the symbol location is an index of the symbol that carries the synchronization information.

7. An apparatus, comprising:
a receiver; and
a processor;
wherein the receiver is configured to receive synchronization information from a device; and
wherein the processor is configured to:
obtain an index of the synchronization information;
obtain time-domain location information of the synchronization information, wherein the time-domain location information is obtained from synchronization configuration information corresponding to the synchronization information;
determine a time segment of a synchronization period used by the device to send the synchronization information, wherein the time segment is an outer loop time segment in a synchronization period or an inner loop time segment in the synchronization period, and the time segment is determined by the apparatus according to the time-domain location information of the synchronization information, and a relative time-domain location of the outer loop time segment in the synchronization period or a relative time-domain location of the inner loop time segment in the synchronization period;

after obtaining the index and receiving the synchronization information, determine a symbol location of a symbol that carried the received synchronization information, wherein the symbol location is determined by the processor using the obtained index and a correspondence between the obtained index and the symbol location; and perform time-domain symbol synchronization with the device according to the determined symbol location of the synchronization information.

8. The apparatus according to claim 7, wherein the symbol location comprises more than one symbol.

9. The apparatus according to claim 7, wherein the correspondence between the obtained index and the symbol location is preset.

10. The apparatus according to claim 7, wherein the processor is further configured to:
determine the relative time-domain location of the outer loop time segment in the synchronization period or the relative time-domain location of the inner loop time segment in the synchronization period according to a length of the synchronization period and a total beam quantity.

11. The apparatus according to claim 7, wherein the synchronization information comprises primary synchronization information and second synchronization information.

12. The apparatus according to claim 7, wherein the processor is further configured to:
obtain indication information from broadcast information corresponding to the synchronization information, wherein the indication information indicates the time segment of the synchronization period used by the device to send the synchronization information; and
determine, according to the indication information, the time segment of the synchronization period used by the device to send the synchronization information.

13. The apparatus according to claim 7, wherein the symbol location is an index of the symbol that carries the synchronization information.

14. A non-transitory computer readable storage medium, comprising instructions, which, when executed, cause a computer to:
receive synchronization information from a device;
obtain an index of the synchronization information;
obtain time-domain location information of the synchronization information from synchronization configuration information corresponding to the synchronization information;
determine, according to the time-domain location information of the synchronization information, and a relative time-domain location of an outer loop time segment in a synchronization period or a relative time-domain location of an inner loop time segment in the synchronization period, in which of the outer loop time segment and the inner loop time segment the synchronization information is sent;
after obtaining the index and receiving the synchronization information, determine a symbol location of a symbol that carried the received synchronization information, where in the symbol location is determined using the obtained index and a correspondence between the obtained index and the symbol location; and perform time-domain symbol synchronization with the device according to the symbol location of the determined synchronization information.

15. The non-transitory computer readable storage medium according to claim 14, wherein the correspondence between the obtained index and the symbol location is preset.

16. The non-transitory computer readable storage medium according to claim 14, wherein the symbol location is an index of the symbol that carries the synchronization information.

* * * * *